United States Patent
Kim et al.

(10) Patent No.: US 9,531,516 B2
(45) Date of Patent: Dec. 27, 2016

(54) METHOD AND DEVICE FOR DECODING DOWNLINK DATA

(71) Applicant: LG Electronics Inc., Seoul (KR)

(72) Inventors: Bonghoe Kim, Seoul (KR); Dongyoun Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/443,119

(22) PCT Filed: Feb. 21, 2014

(86) PCT No.: PCT/KR2014/001418
§ 371 (c)(1),
(2) Date: May 15, 2015

(87) PCT Pub. No.: WO2014/193068
PCT Pub. Date: Dec. 4, 2014

(65) Prior Publication Data
US 2016/0065338 A1    Mar. 3, 2016

Related U.S. Application Data

(60) Provisional application No. 61/829,240, filed on May 30, 2013.

(51) Int. Cl.
*H04L 5/00* (2006.01)
*H04W 72/04* (2009.01)
*H04L 27/26* (2006.01)

(52) U.S. Cl.
CPC ............. *H04L 5/0048* (2013.01); *H04L 5/005* (2013.01); *H04L 5/0007* (2013.01);
(Continued)

(58) Field of Classification Search
CPC ...... H04L 5/005; H04L 5/0094; H04L 5/0035; H04L 5/0007; H04L 5/0048; H04L 27/2607; H04W 72/0453
See application file for complete search history.

(56) References Cited

U.S. PATENT DOCUMENTS

| | | | |
|---|---|---|---|
| 2011/0158200 A1 | 6/2011 | Bachu et al. | |
| 2013/0194931 A1* | 8/2013 | Lee | H04L 5/0053 370/241 |

(Continued)

OTHER PUBLICATIONS

Interdigital, "Collision handling between PRS and EPDCCH," R1-132177, 3GPP TSG RAN WG1 Meeting #73, Fukuoka, Japan, May 20-24, 2013, see pp. 1-4.

(Continued)

*Primary Examiner* — Brian D Nguyen
(74) *Attorney, Agent, or Firm* — Dentons US LLP

(57) ABSTRACT

Method for decoding data in a downlink subframe involves a terminal receiving downlink data in a data subframe transmitted in a first serving cell; the terminal receiving configuration information about PRS subframes which transmit PRS, wherein the PRS subframes are transmitted in a second serving cell; and determining whether the terminal decodes, according to the configuration information, the data transmitted through a PDSCH or an EPDCCH in the data subframe, wherein the decoding of the data transmitted through the PDSCH or the EPDCCH is abandoned by the terminal when a first CP length of the data subframe is different from a first subframe CP length of a first frame which includes the data subframe, and the data subframe may overlap with at least one PRS subframe of the PRS subframes.

8 Claims, 17 Drawing Sheets

(52) U.S. Cl.
CPC .......... *H04L 5/0035* (2013.01); *H04L 5/0094* (2013.01); *H04W 72/0453* (2013.01); *H04L 27/2607* (2013.01)

(56) References Cited

U.S. PATENT DOCUMENTS

| | | | |
|---|---|---|---|
| 2013/0250882 A1* | 9/2013 | Dinan ................ | H04W 72/0426 370/329 |
| 2013/0286966 A1* | 10/2013 | Chung .............. | H04W 72/0406 370/329 |
| 2013/0294369 A1* | 11/2013 | Dinan .................... | H04L 5/001 370/329 |
| 2013/0301434 A1* | 11/2013 | Krishnamurthy ..... | H04L 1/0026 370/252 |
| 2013/0301491 A1* | 11/2013 | Bashar ................ | H04W 76/048 370/280 |
| 2013/0301542 A1* | 11/2013 | Krishnamurthy ..... | H04W 52/50 370/329 |

OTHER PUBLICATIONS

ZTE, "EPDCCH monitoring in PRS subframe," R1-132095, 3GPP TSG RAN WG1 Meeting #73, Fukuoka, Japan, May 20-24, 2013, see pp. 1-4.

Interdigital Communications, "PRS collision handling for ePDCCH," R1-123408, 3GPP TSG RAN WG1 Meeting #70, Qingdao, China, Aug. 13-17, 2012, pp. 1-3.

Qualcomm Incorporated, "Configuration of Subframes for Monitoring ePDCCH," R1-124450, 3GPP TSG RAN WG1 #70bis, San Diego, CA, USA, Oct. 8-12, 2012, see pp. 1-3.

* cited by examiner

FIG. 9
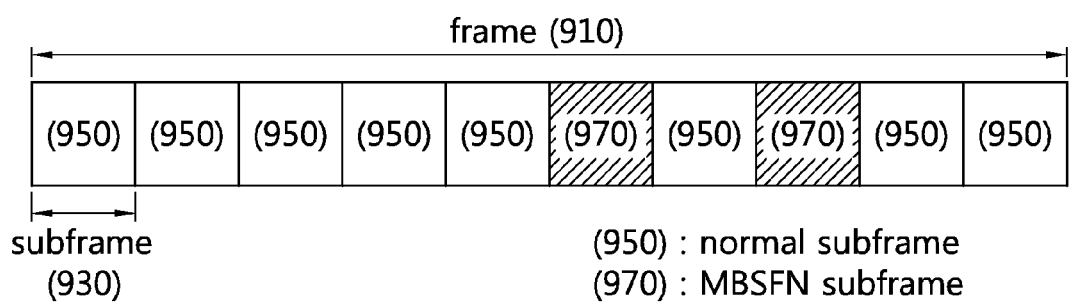
(950) : normal subframe
(970) : MBSFN subframe
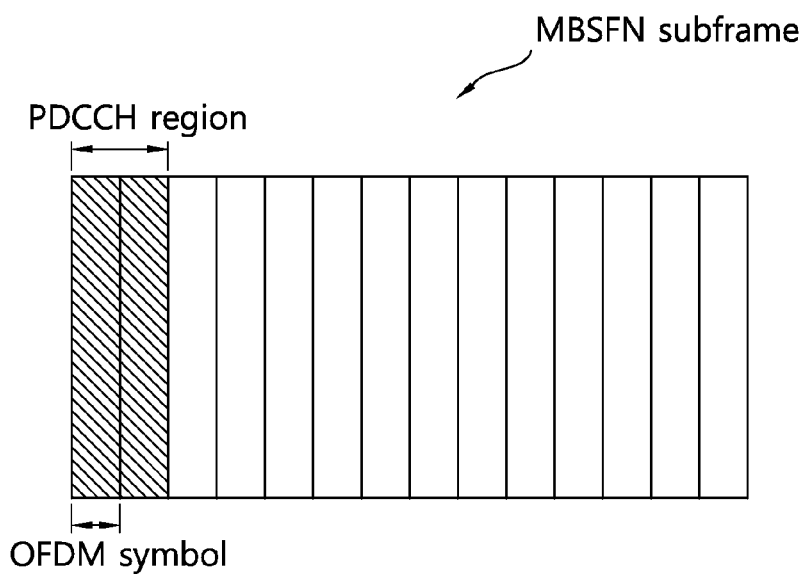

FIG. 11
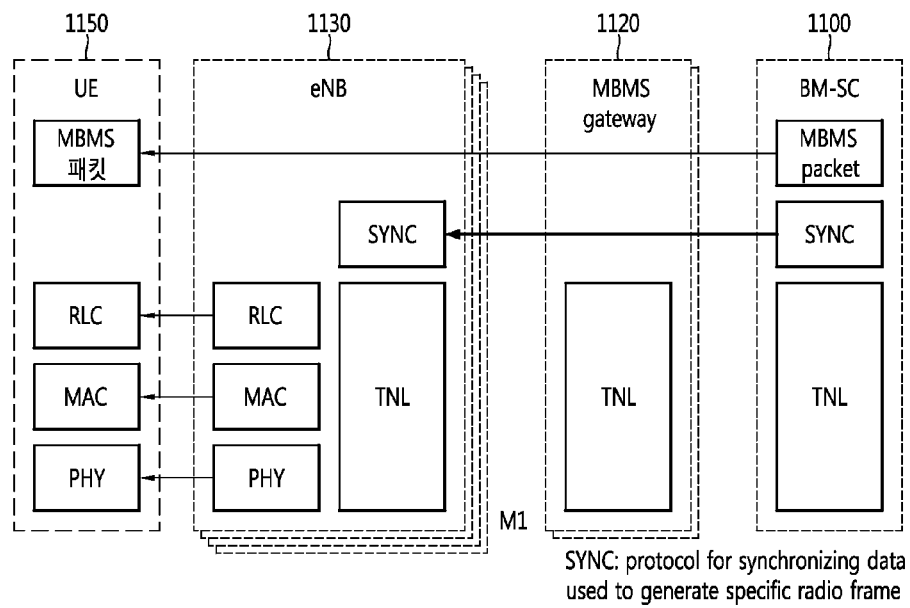
SYNC: protocol for synchronizing data used to generate specific radio frame
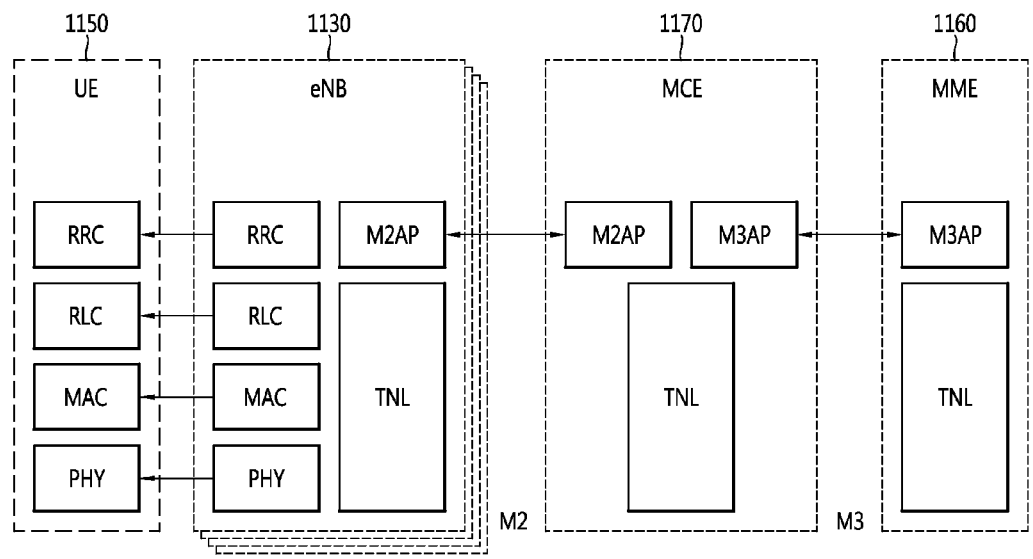

FIG. 13
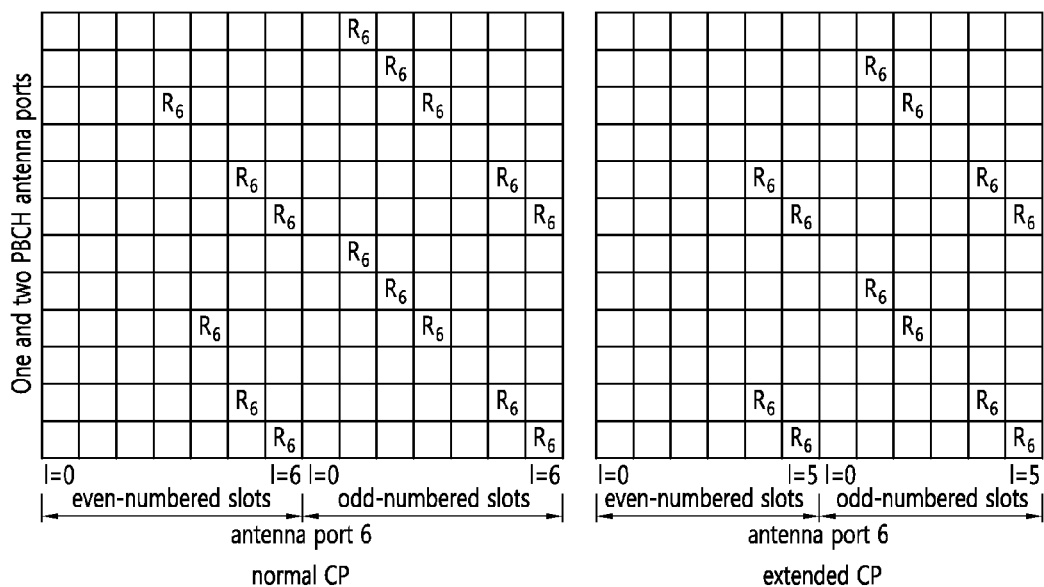
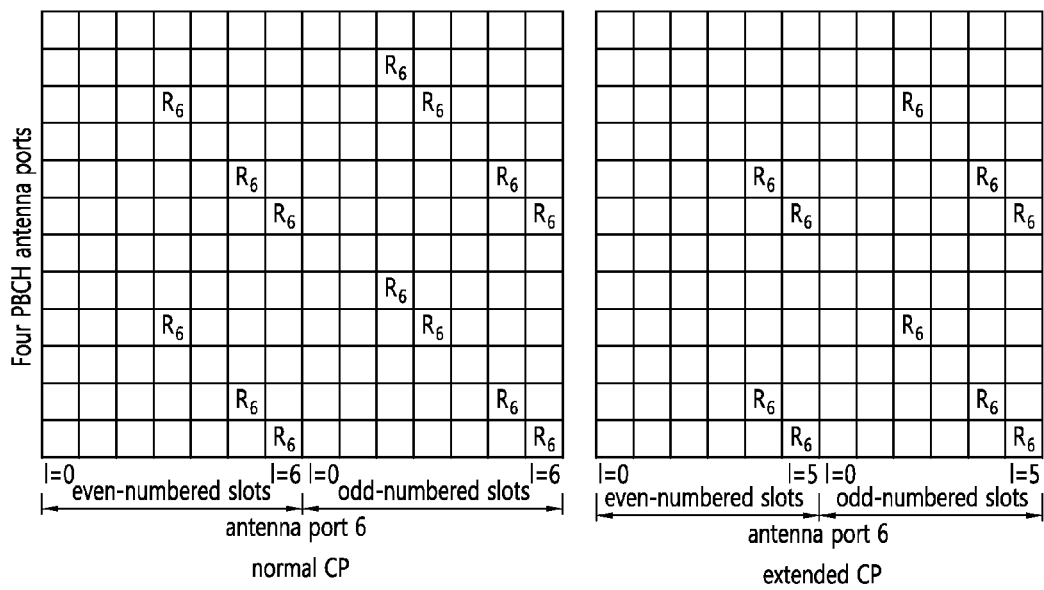

METHOD AND DEVICE FOR DECODING DOWNLINK DATA

This application is a 35 USC §371 National Stage entry of International Application No. PCT/KR2014/001418 filed on Feb. 21, 2014, and claims priority to U.S. Provisional Application No. 61/829,240 filed on May 30, 2013, all of which are hereby incorporated by reference in their entireties as if fully set forth herein.

BACKGROUND OF THE INVENTION

1. Field of the Invention

The present invention relates to wireless communications, and more particularly, to a method and apparatus for decoding downlink data.

2. Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of uplink control information such as a hybrid automatic repeat request (HARQ) acknowledgement (ACK)/negative-acknowledgement (NACK) signal, a channel quality indicator (CQI), and a scheduling request (SR).

Meanwhile, there is ongoing development on 3GPP LTE-advanced (A) which is an evolution of 3GPP LTE. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

SUMMARY OF THE INVENTION

The present invention provides a method of decoding data on a downlink subframe.

The present invention also provides a user equipment for decoding data on a downlink subframe.

According to an aspect of the present invention, a method of decoding data on a downlink subframe is provided. The method includes: receiving, by a user equipment, downlink data on a data subframe transmitted on a first serving cell; receiving, by the user equipment, configuration information regarding a plurality of positioning reference signal (PRS) subframes for transmitting a PRS, wherein the plurality of PRS subframes are transmitted on a second serving cell; and determining whether the user equipment decodes data transmitted through a physical downlink shared channel (PDSCH) or an enhanced physical downlink control channel (EPDCCH) on the data subframe according to the configuration information. If a first cyclic prefix (CP) length of the data subframe is different from a CP length of a first subframe of a first frame including the data subframe, data transmitted through the PDSCH and the EPDCCH may be abandoned by the user equipment. The data subframe may overlap with at least one PRS subframe among the plurality of PRS subframes.

According to another aspect of the present invention, a user equipment for decoding data on a downlink subframe is provided. The user equipment includes: a radio frequency (RF) unit for receiving the data on the downlink subframe; and a processor selectively coupled to the RF unit. The processor may be implemented to: receive downlink data on a data subframe transmitted on a first serving cell; receive configuration information regarding a plurality of PRS subframes for transmitting a PRS, wherein the plurality of PRS subframes are transmitted on a second serving cell; and determine whether the user equipment decodes data transmitted through a PDSCH or an EPDCCH on the data subframe according to the configuration information. If a first CP length of the data subframe is different from a CP length of a first subframe of a first frame including the data subframe, data transmitted through the PDSCH and the EPDCCH may be abandoned by the user equipment. The data subframe may overlap with at least one PRS subframe among the plurality of PRS subframes.

When a user equipment receives a positioning reference signal (PRS) subframe from one of a plurality of cells subjected to an intra-band contiguous carrier aggregation, a subframe for performing decoding on a physical downlink shared channel (PDSCH) can be determined among subframes transmitted from a different cell subjected to the intra-band contiguous carrier aggregation. Therefore, the user equipment can selectively perform decoding on the decodable PDSCH.

BRIEF DESCRIPTION OF THE DRAWINGS

FIG. 9 shows the concept of a multimedia broadcast single frequency network (MBSFN) subframe.

FIG. 11 shows the concept of a protocol for supporting a multimedia broadcast multicast service (MBMS).

FIG. 13 shows the concept of a positioning reference signal (PRS).

DESCRIPTION OF EXEMPLARY EMBODIMENTS

An user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, a terminal, a wireless terminal, etc.

A base station (BS) is generally a fixed station that communicates with the wireless device and may be referred to as another terminology, such as an evolved Node-B (eNB), a base transceiver system (BTS), an access point, etc.

Figure 1:
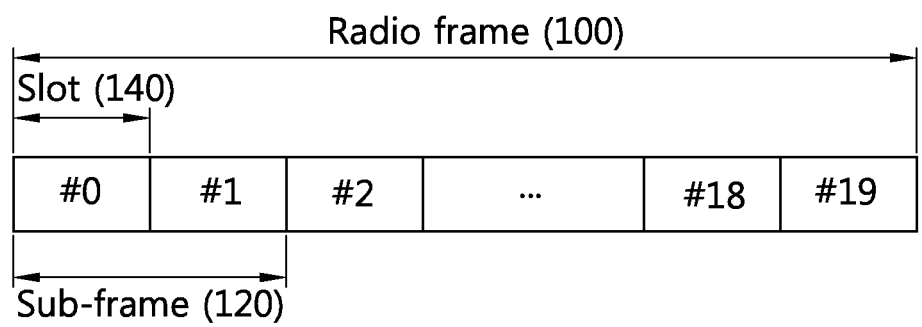
FIG. 1 shows a structure of a radio frame in long term evolution (LTE).

FIG. 1 shows the structure of a radio frame in 3GPP LTE.

The structure of a radio frame (100) in 3GPP LTE may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
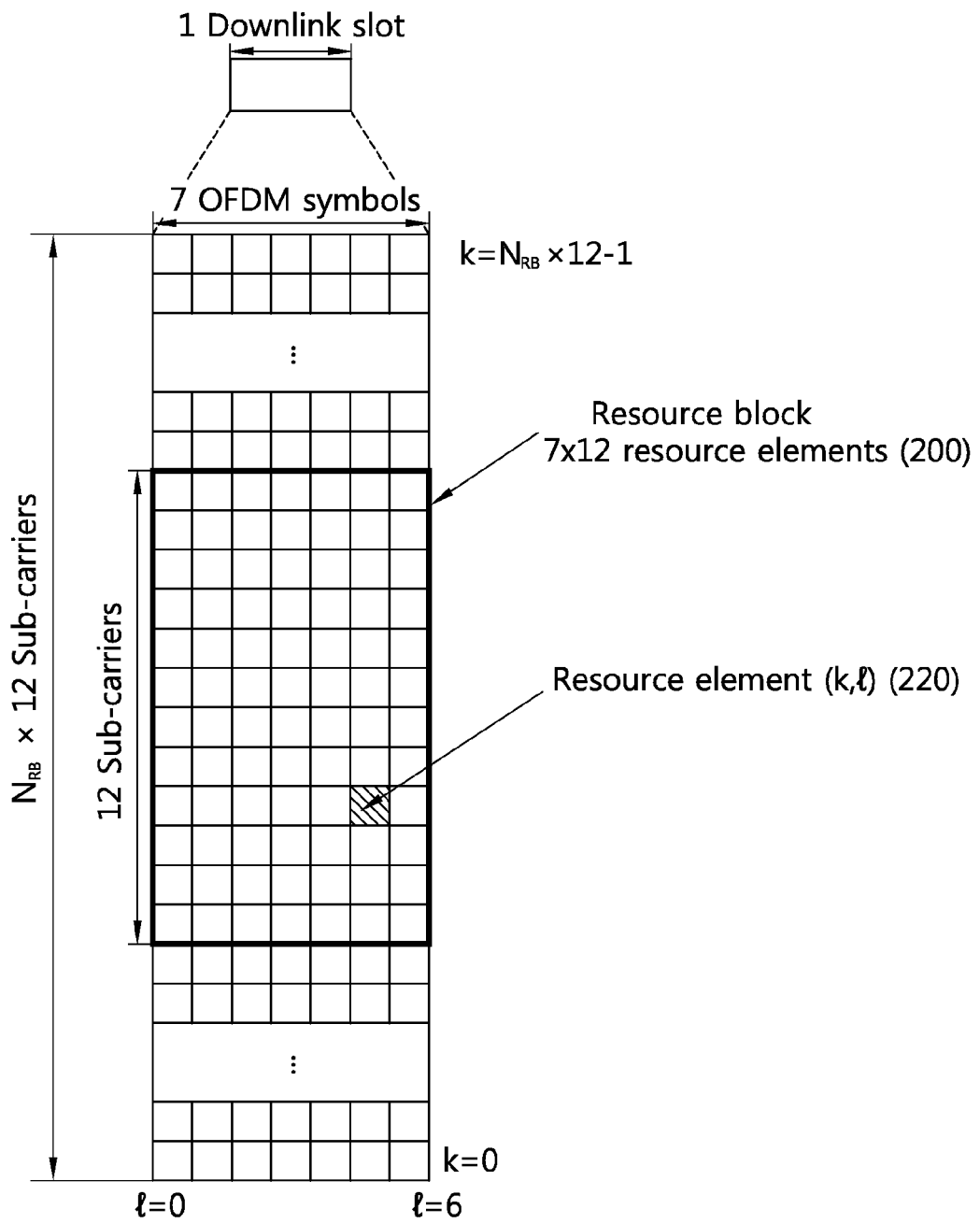
FIG. 2 shows an example of a resource grid for a downlink slot.

FIG. 2 shows an example of a resource grid of a downlink slot.

A downlink slot includes a plurality of OFDM symbols in the time domain and $N_{RB}$ number of resource blocks in the frequency domain. The $N_{RB}$ number of resource blocks included in the downlink slot may be determined depending upon a downlink transmission bandwidth which is configured in a cell. For example, in an LTE system, $N_{RB}$ may have any one value of 60 to 110 depending upon the transmission bandwidth which is used. One resource block 200 includes a plurality of subcarriers in the frequency domain. An uplink slot may have the same structure as that of the downlink slot.

Each element on the resource grid is called a resource element 220. The resource elements 220 on the resource grid can be discriminated by a pair of indexes (k,l) in the slot. Here, k (k=0, . . . , $N_{RB} \times 12-1$) is a subcarrier index in the frequency domain, and l (l=0, . . . , 6) is an OFDM symbol index in the time domain.

Herein, one resource block 200 may include 7×12 resource elements made up of seven OFDM symbols in the time domain and twelve subcarriers in the frequency domain. Such a size is just an example, and the number of OFDM symbols and subcarriers constituting one resource block 200 may be changed. The resource block pair indicates a resource basis that includes two resource blocks.

As described above, the number of OFDM symbols in one slot may have different values depending on the CP. Also, the number of resource blocks included in one slot may be changed depending on the size of overall frequency bandwidth.

Figure 3:
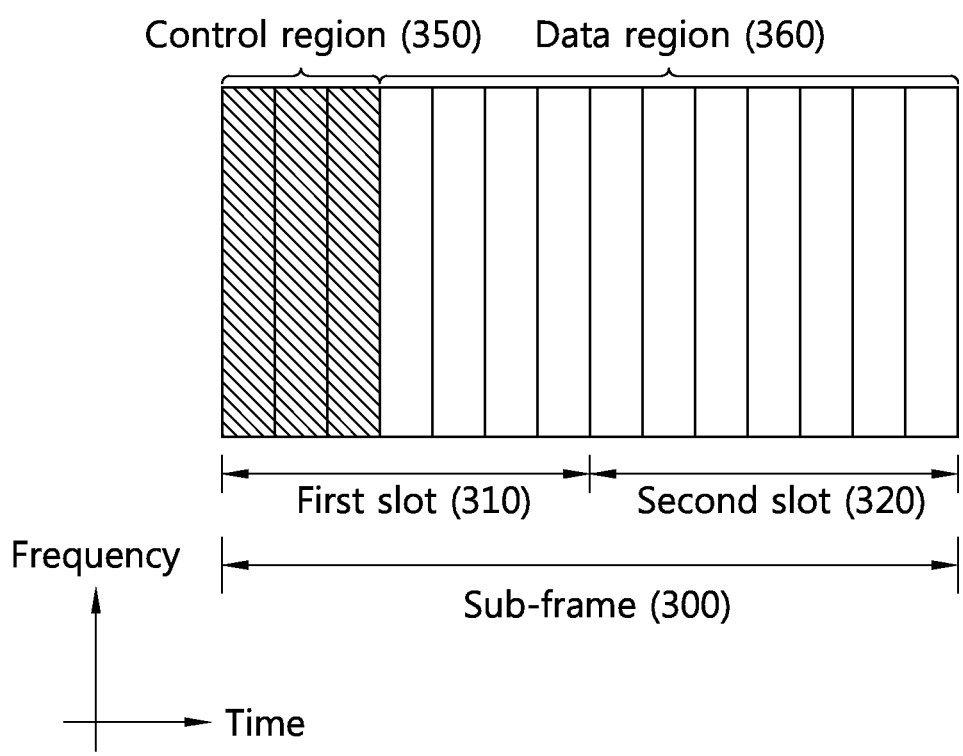
FIG. 3 shows a structure of a downlink subframe.

FIG. 3 shows the structure of a downlink subframe.

A downlink subframe 300 may be distinguished into two slots 310 and 320 base on the time domain. Each of the slots 310 and 320 includes seven OFDM symbols in the normal CP. A resource region that corresponds to first three OFDM symbols (maximum four OFDM symbols with respect to a 1.4 MHz bandwidth) of a first slot 310 in the subframe 300 may be used as a control region 350 to which control channels are allocated. The other remaining OFDM symbols may be used as a data region 360 to which a traffic channel such as a physical downlink shared channel (PDSCH) is allocated.

The PDCCH may be a control channel that transmits, for example, a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual wireless devices in a certain UE group, an activation of a voice over internet protocol (VoIP), and the like. A plurality of bases that transmits the PDCCH data may be defined in the control region 350. A wireless device may obtain control data by monitoring the plurality of bases that transmits the PDCCH data. For example, the PDCCH data may be transmitted to a wireless device based on one or an aggregation of a plurality of consecutive control channel elements (CCE). The CCE may be a basis of transmitting the PDCCH data. The CCE may include a plurality of resource element groups. The resource element group is a resource basis that includes four usable resource elements.

The BS determines a PDCCH format according to a DCI to be transmitted to the wireless device, and attaches a cyclic redundancy check (CRC) to the DCI. A unique radio network temporary identifier (RNTI) is masked on the CRC according to the owner or the purpose of the PDCCH. In case of a PDCCH for a particular wireless device, a unique identifier, e.g., a cell-RNTI (C-RNTI), of the wireless device, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the wireless device, a random access-RNTI (RA-RNTI) may be masked on the CRC.

Figure 4:
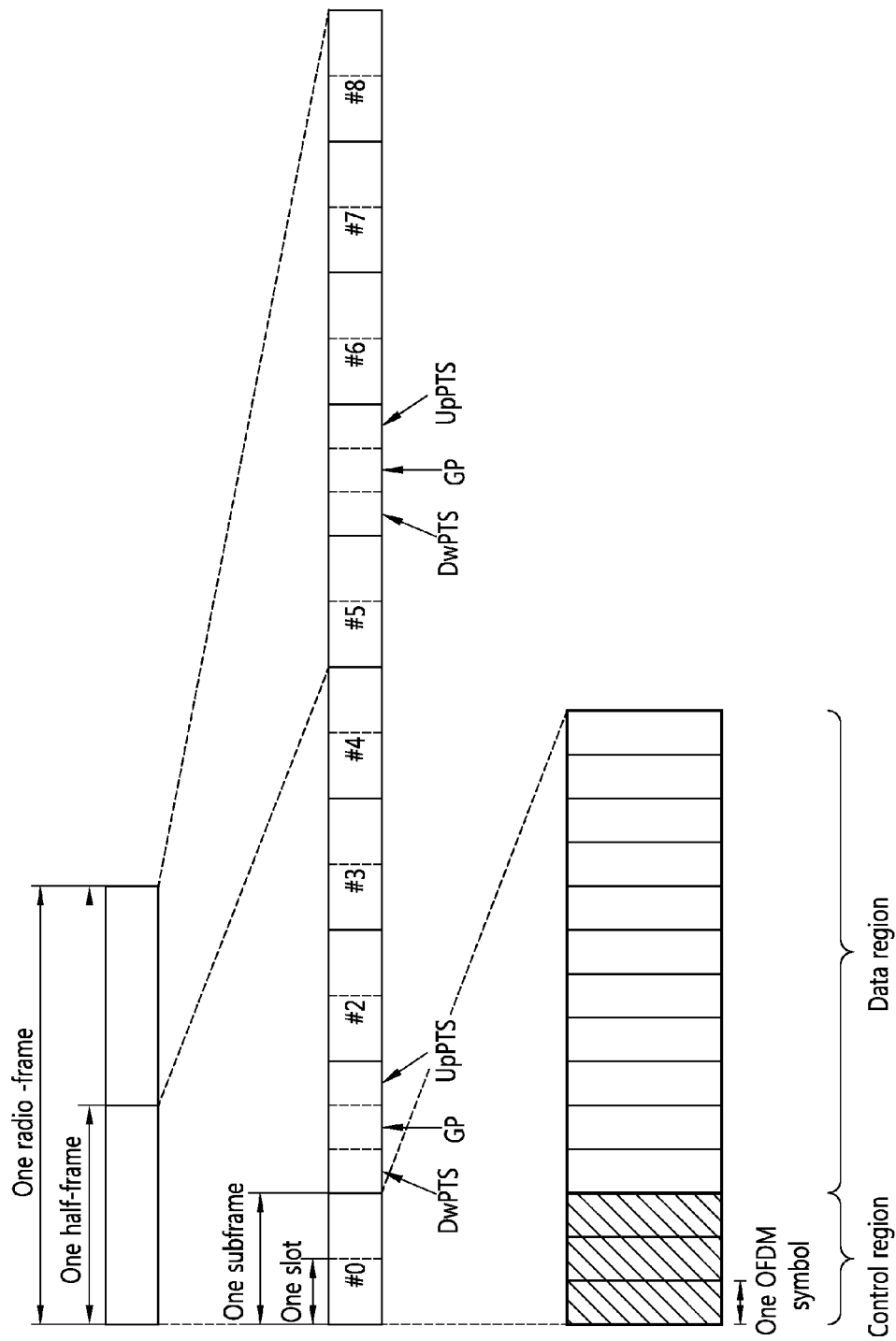
FIG. 4 shows a structure of a downlink radio frame of a time division duplex (TDD) mode in $3^{rd}$ generation partnership project (3GPP) LTE.

FIG. 4 shows downlink radio frame structure in TDD.

For downlink radio frame structure in TDD, 3rd generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference, and it is related to a time division duplex (TDD).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and downlink.

In TDD, a downlink (DL) subframe and an uplink (UL) subframe co-exist in one radio frame. Table 1 shows an example of a configuration of the radio frame.

TABLE 1

| Unlink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

The PCFICH transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Figure 5:
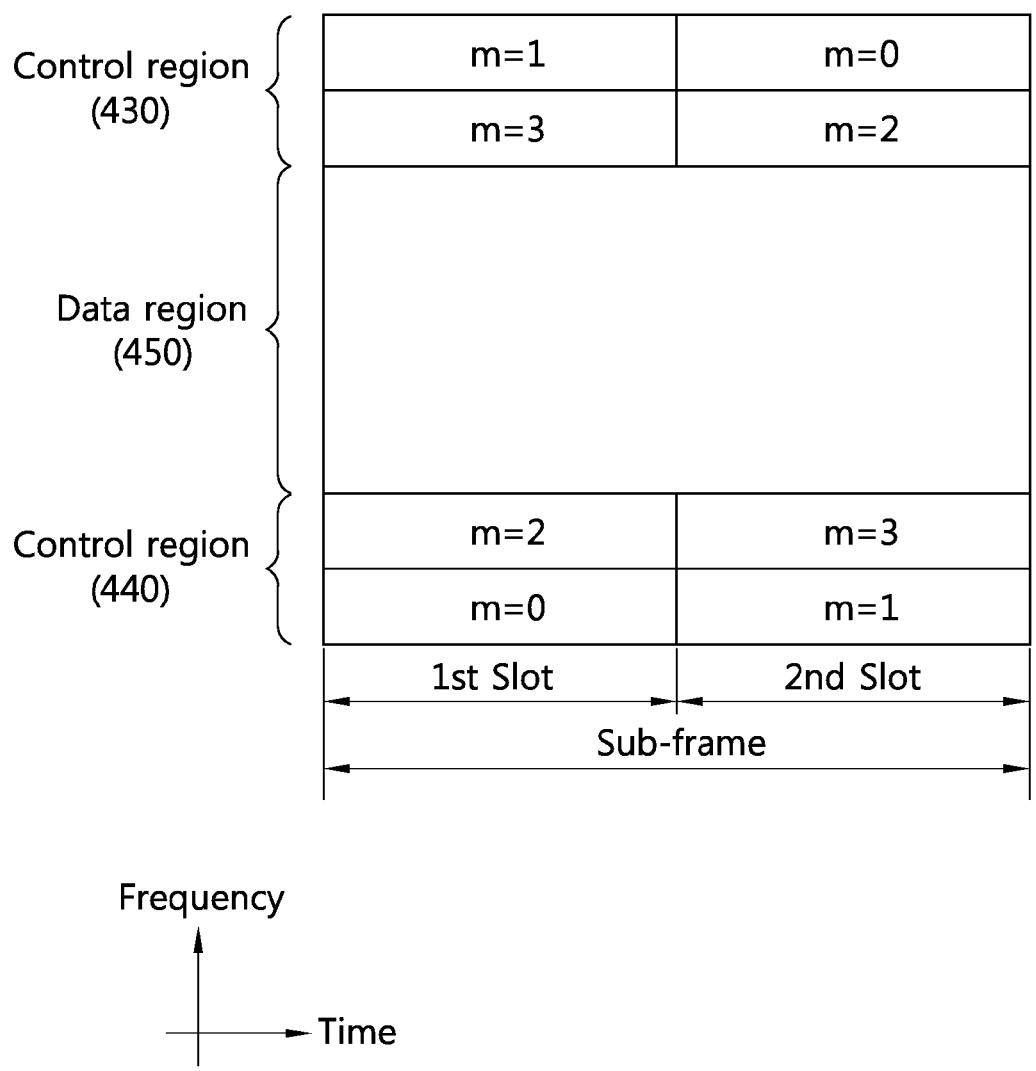
FIG. 5 shows a structure of an uplink subframe in 3GPP LTE.

FIG. 5 is a view illustrating the structure of an uplink subframe in 3GPP LTE.

The uplink subframe may be divided into a control region allocated to a physical uplink control channel (PUCCH) for delivering uplink control information and a data region allocated to a physical uplink shared channel (PUSCH) for delivering user data. PUCCH resources for allocation may be located at the edge of bandwidth of a component carrier (CC).

The PUCCH may be allocated based on a RB pair in the subframe. RBs corresponding to the RB pair may be allocated to different subcarriers in a first and a second slots respectively. m is a position index indicating the position of a logical frequency domain of the RB pair which is allocated to the PUCCH in the subframe. RBs having the same value of m are allocated to different subcarriers of the first and second slots.

According to 3GPP TS 36.211 V8.7.0, the PUCCH may have various formats. It is possible to use Different PUCCH formats with different bit numbers in the subframe according to a modulation scheme for use in the PUCCH format.

Table 2 shows an example of bit numbers per subframe and the modulation scheme according to the PUCCH format.

TABLE 2

| PUCCH format | Modulation scheme | bit number per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

PUCCH format 1 for scheduling request (SR) transmission, PUCCH format 1a/1b for transmitting an ACK/NACK signal for HARQ, PUCCH format 2 for CQI transmission, and PUCCH format 2a/2b for simultaneous transmission of the CQI and the ACK/NACK signals are used. When only the ACK/NACK signal is transmitted in the subframe, PUCCH format 1a/1b is used, and when only the SR is transmitted, PUCCH format 1 is used. When the SR and the ACK/NACK signal are transmitted simultaneously, PUCCH format 1 is used, and the ACK/NACK signal is transmitted after being modulated to resources allocated to the SR.

The entire PUCCH formats use cyclic shift (CS) of a sequence for each OFDM symbol. A base sequence is cyclically shifted by specific CS amount to generate a cyclic shift sequence. The specific CS amount is indicated by a CS index.

The sequence length is equal to the number of an element included in the sequence. The sequence index for indicating the sequence may be determined based on a cell identifier, a slot number within a radio frame, and the like. Assuming that a base sequence is mapped to one resource block in the frequency domain, one resource block includes 12 subcarriers, and thus the length of the base sequence N is 12. The cyclic shift sequence may be generated by cyclically shifting the base sequence.

The available cyclic shift index to the base sequence may be induced from the base sequence based on a CS interval. For example, when the base sequence length is 12 and the CS interval is 2, total number of the available cyclic shift indices to the base sequence is 6. Hereinafter, HARQ ACK/NACK signal transmission in PUCCH format 1b will be described.

Figure 6:
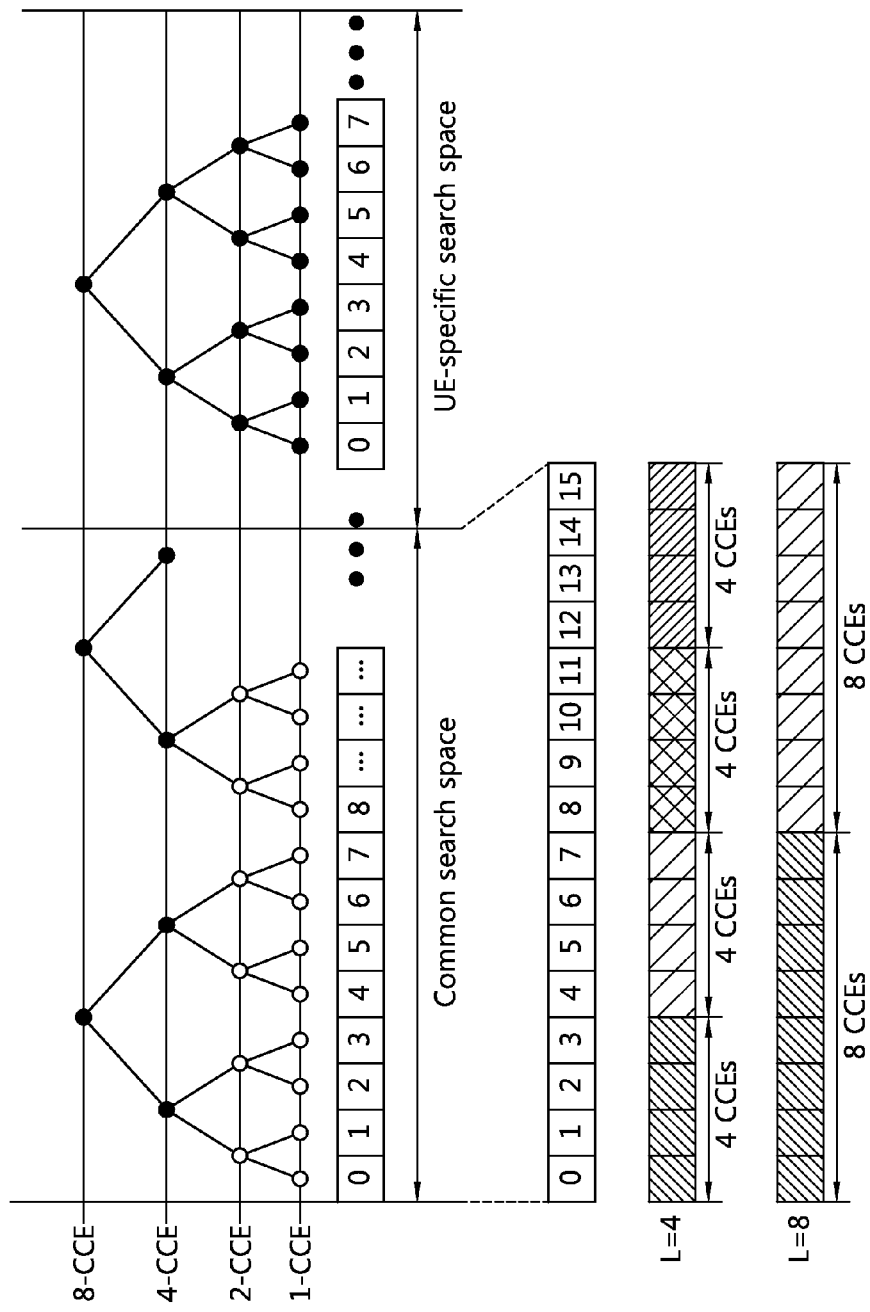
FIG. 6 shows an example of monitoring of a physical downlink control channel (PDCCH).

FIG. 6 is a view illustrating an example of monitoring PDCCH.

For a PDCCH monitoring procedure, refer to 3GPP TS 36.213 V10.2.0 (2011-06), Ch. 9.

A UE can perform blind decoding for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of CCE aggregation level or DCI format for transmission and a position at which its PDCCH data is transmitted in a control region.

A plurality of PDCCHs may be transmitted in one subframe. The UE monitors a plurality of PDCCHs at every sub-frame. Here, the term "monitoring" refers to the UE attempting to perform blind decoding on a PDCCH.

In 3GPP LTE, the UE uses a search space for reducing load caused by blind decoding. The search space may be regarded as CCEs' monitoring set for searching a PDCCH. The UE monitors the PDCCH based on the search space.

The search space is divided into a common search space and a UE-specific search space. The common search space is a space for searching a PDCCH having common control information and consists of 16 CCEs, CCE index 0 to 15, and supports PDCCHs having a CCE aggregation level of {4, 8}. However, a PDCCH (DCI formats 0 and 1A) for carrying UE-specific information may be transmitted even in the common search space. The UE-specific search space supports PDCCHs having a CCE aggregation level of {1, 2, 4, 8}.

The following table 3 shows the number of PDCCH candidates that are monitored by the UE.

TABLE 3

| Type | Search space $S_k^{(L)}$ Aggregation level L | Size [in CCEs] | Number of PDCCH candidates $M^{(L)}$ | DCI Format |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, 3/3A |
|  | 8 | 6 | 2 |  |

The size of a search space is determined according to Table 3 above, and the start point of a search space is defined differently for each of the common search space and UE-specific search space. The start point of the common search space is fixed regardless of any sub-frame, but the start point of the UE-specific search space may vary per sub-frame depending on the UE identifier (e.g., C-RNTI), CCE aggregation level and/or slot number in a radio frame. In case the start point of the UE-specific search space is positioned in the common search space, the UE-specific search space and the common search space may overlap.

An aggregation of PDCCH candidates monitored by the UE may be defined on the basis of a search space. In an aggregation level 1, 2, 4 or 8, search space $S_k^{(L)}$ is defined as a set of PDCCH candidates. The CCE corresponding to PDCCH candidate m in search space $S_k^{(L)}$ is given as follows:

$$L\{(Y_k+m') \bmod \lfloor N_{CCE,k}/L \rfloor\}+i \qquad \text{Equation 1}$$

Here, i=0, . . . L-1, and in case the search space is the common search space, m'=m. In case the search space is a specific search space, and a carrier indicator field (CIF) is configured to the UE, m=m+$M^{(L)}$·$n_{CI}$, $n_{CI}$ is a value of the configured CIF. If the CIF is not configured to the UE, m'=m. Here, it is m=0, . . . , $M^{(L)}$−1 and $M^{(L)}$ is the number of the PDCCH candidates for monitoring the given search space.

In the common search space, Yk is set as 0 for two aggregation levels, L=4 and L=8. In the UE-specific search space of aggregation level L, variable Yk is defined as follows:

$$Y_k = (A \cdot Y_{k-1}) \bmod D \qquad \text{Equation 2}$$

Here, $Y_{-1}$=$n_{RNTI}$≠0, A=39827, D=65537, k=$\lfloor n_s/2 \rfloor$, and $n_s$ is a slot number in a radio frame.

When a wireless device monitors the PDCCH based on the C-RNTI, a DCI format, and a search space are determined according to a PDSCH transmission mode. Table 12 below shows an example of monitoring PDCCH in which the C-RNTI is configured.

TABLE 4

| Transmission mode | DCI format | Search Space | Transmission mode of PDSCH corresponding to PDCCH |
|---|---|---|---|
| Mode 1 | DCI format 1A | Common and UE specific | Single-antenna port, port 0 |
| | DCI format 1 | UE specific | Single-antenna port, port 0 |
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Cyclic Delay Diversity(CDD) or Transmit diversity |
| Mode 4 | DCI format 1A | Common and UE specific | Transmit diversity |
| | DCI format 2 | UE specific | Closed-loop spatial multiplexing |
| Mode 5 | DCI format 1A | Common and UE specific | Transmit diversity |
| | DCI format 1D | UE specific | Multi-user Multiple Input Multiple Output(MU-MIMO) |
| Mode 6 | DCI format 1A | Common and UE specific | Transmit diversity |
| | DCI format 1B | UE specific | Closed-loop spatial multiplexing |
| Mode 7 | DCI format 1A | Common and UE specific | If the number of PBCH transmit ports is one, single-antenna port, port 0 is used, otherwise Transmit diversity |
| | DCI format 1 | UE specific | Single-antenna port, port 5 |
| Mode 8 | DCI format 1A | Common and UE specific | If the number of PBCH transmit ports is one, single-antenna port, port 0 is used, otherwise Transmit diversity |
| | DCI format 2B | UE specific | Dual layer transmit, port 7 or 8 or single-antenna port, port 7 or 8 |

Uses of DCI formats can be classified as shown in the following table.

TABLE 5

| DCI format | Description |
|---|---|
| DCI format 0 | used for the scheduling of PUSCH |
| DCI format 1 | used for the scheduling of PDSCH codeword |
| DCI format 1A | used for the compact scheduling of one PDSCH codeword and random access procedure |
| DCI format 1B | used for the compact scheduling of one PDSCH codeword with precoding information |
| DCI format 1C | used for the compact scheduling of one PDSCH codeword |
| DCI format 1D | used for the compact scheduling of one PDSCH codeword with precoding and power offset information |
| DCI format 2 | used for the scheduling PDSCH to UEs configured in closed-loop spatial multiplexing mode |
| DCI format 2A | used for the scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustment |

A DCI format and search space in use may be determined differently according to an RNTI masked to a CRC used in DCI generation. Table 6 below shows a control channel's search space and DCI format used when SI-RNTI, P-RNTI, or RA-RNTI is masked to the CRC of the DCI.

TABLE 6

| DCI format | Search space | Transmission mode of PDSCH corresponding to PDCCH |
|---|---|---|
| DCI format 1C | Common | If the number of PBCH transmit ports is one, single-antenna port, port 0 is used, otherwise Transmit diversity |
| DCI format 1A | Common | If the number of PBCH transmit ports is one, single-antenna port, port 0 is used, otherwise Transmit diversity |

Table 7 below shows a control channel's search space and DCI format used when SPS-C-RNT is masked to the CRC of the DCI.

TABLE 7

| Transmission mode | DCI format | Search space | Transmission mode of PDSCH corresponding to PDCCH |
|---|---|---|---|
| Mode 1 | DCI format 1A | Common and UE specific | Single antenna port, port 0 |
| | DCI format 1 | UE specific | Single antenna port, port 0 |

TABLE 7-continued

| Transmission mode | DCI format | Search space | Transmission mode of PDSCH corresponding to PDCCH |
|---|---|---|---|
| Mode 2 | DCI format 1A | Common and UE specific | Transmit diversity |
| | DCI format 1 | UE specific | Transmit diversity |
| Mode 3 | DCI format 1A | Common and UE specific | Transmit diversity |
| | DCI format 2A | UE specific | Transmit diversity |
| Mode 4 | DCI format 1A | Common and UE specific | Transmit diversity |
| | DCI format 2 | UE specific | Transmit diversity |
| Mode 5 | DCI format 1A | Common and UE specific | Transmit diversity |
| Mode 6 | DCI format 1A | Common and UE specific | Transmit diversity |
| Mode 7 | DCI format 1A | Common and UE specific | Single antenna port 5 |
| | DCI format 1 | UE specific | Single antenna port 5 |
| Mode 8 | DCI format 1A | Common and UE specific | Single antenna port 7 |
| | DCI format 2B | UE specific | Single antenna port 7 or 8 |
| Mode 9 | DCI format 1A | Common and UE specific | Single antenna port 7 |
| | DCI format 2C | UE specific | Single antenna port 7 or 8 |
| Mode 10 | DCI format 1A | Common and UE specific | Single antenna port 7 |
| | DCI format 2D | UE specific | Single antenna port 7 or 8 |

Table 8 below shows a control channel's search space and DCI format used when temporary C-RNTI is masked to the CRC of the DCI.

TABLE 8

| DCI format | Search space | Transmission mode of PDSCH corresponding to PDCCH |
|---|---|---|
| DCI format 1A | Common and UE specific | If the number of PBCH transmit ports is one, single-antenna port, port 0 is used, otherwise Transmit diversity |
| DCI format 1 | Common and UE specific | If the number of PBCH transmit ports is one, single-antenna port, port 0 is used, otherwise Transmit diversity |

Figure 7:
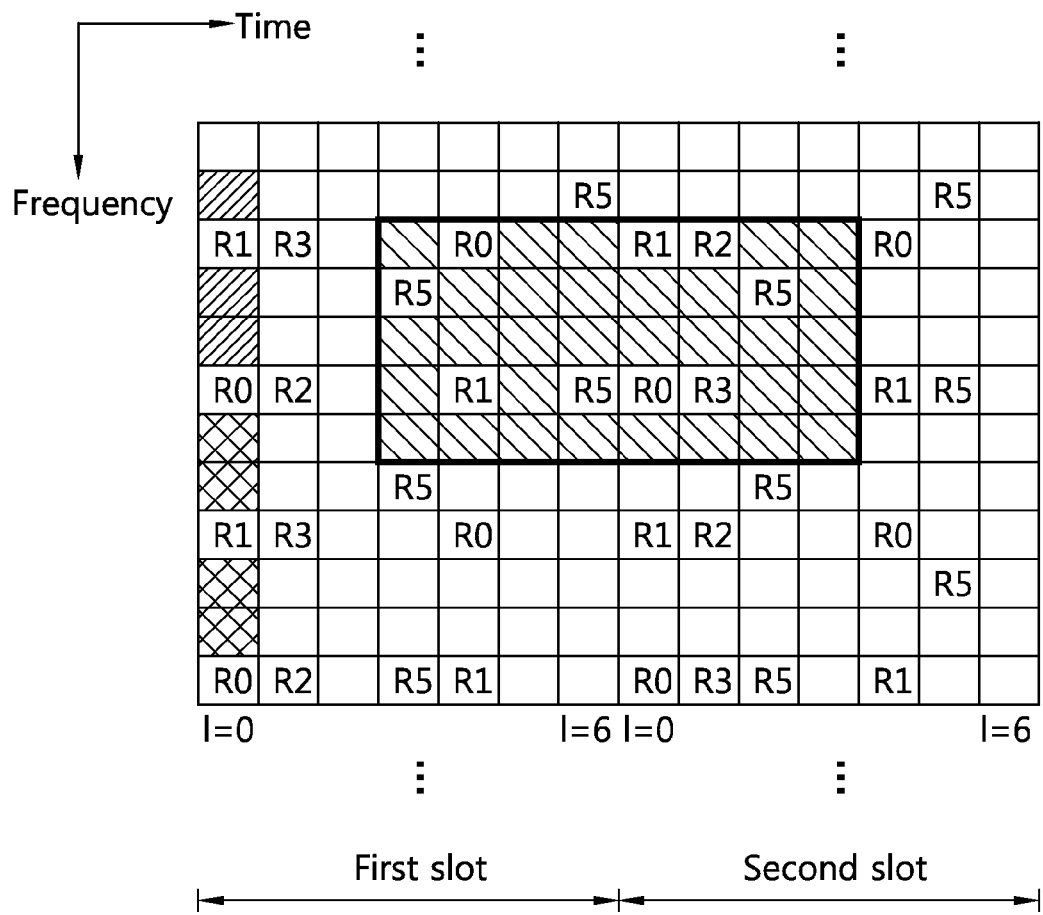
FIG. 7 shows a downlink subframe to which a control channel and a reference signal of 3GPP LTE are allocated.

FIG. 7 shows an example of a downlink subframe in which a reference signal and a control channel in 3GPP LTE are allocated.

A downlink subframe may be classified into a control region and a data region. For example, in the downlink subframe, the control region (or a PDCCH region) includes front three OFDM symbols and the data region in which a PDSCH is transmitted includes remaining OFDM symbols.

In the control region, a PCFICH, a PHICH and/or the PDCCH are transmitted.

The physical HARQ ACK/NACK indicator channel (PHICH) may transmit a hybrid automatic retransmission request (HARQ) information as a response to a uplink transmission.

The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well.

A cell-specific reference signal reference signal (CRS) is a reference signal that all wireless devices in a cell may receive, and may be transmitted over the whole downlink frequency band. In FIG. 6, 'R0' denotes an RE (resource element) where a CRS for a first antenna port is transmitted, 'R1' which is an RE where a CRS for a second antenna port is transmitted, 'R2' which is an RE where a CRS for a third antenna port is transmitted, and 'R3' which is an RE where a CRS for a fourth antenna port is transmitted.

The RS sequence $r_{l,n_s}(m)$ for CRS is defined as follows.

<Equation 3>

$$r_{l,n_s}(m) = \frac{1}{\sqrt{2}}(1 - 2 \cdot c(2m)) + j\frac{1}{\sqrt{2}}(1 - 2 \cdot c(2m+1))$$

Herein, $m=0, 1, \ldots, 2N_{RB}^{max,DL}-1$, $N_{RB}^{max,DL}$ is the maximum number of RBs, ns is a slot number in a radio frame, and l is an OFDM symbol index in a slot.

A pseudo-random sequence, c(i), is defined by a gold sequence whose length is 31, as follows.

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{<Equation 4>}$$

Herein, Nc=1600, and the first m-sequence is initialized as $x1(0)=1$, $x1(n)=0$, $m=1, 2, \ldots, 30$. The second m-sequence is initialized as $c_{init}=2^{10} \cdot (7 \cdot (n_s+1)+l+1) \cdot (2 \cdot N_{ID}^{cell}+1)+2 \cdot N_{ID}^{cell}+N_{CP}$ at the beginning of each OFDM symbol. $N_{ID}^{cell}$ is a physical cell identity (PCI) of the cell, and $N_{CP}=1$ in case of the normal CP, and $N_{CP}=0$ in case of the extended CP.

Also, a UE-specific reference signal (URS) may be transmitted in a subframe. Although the CRS is transmitted in the entire region of a subframe, the URS is transmitted in the data region of the sub-frame, and is a reference signal used for demodulating the PDSCH. In FIG. 7, 'R5' denotes an RE where the URS is transmitted. A DM-RS is a reference signal used for demodulating the EPDCCH data.

The URS may be transmitted in an RB in which the corresponding PDSCH data is mapped. Although in FIG. 7, R5 is denoted outside the area in which the PDSCH is transmitted, this is merely to indicate the position of the RE to which the URS is mapped.

The URS is may be a reference signal which is demodulated only by a specific wireless device. The RS sequence for $r_{l,n_s}(m)$ for the URS is the same as Equation 3. At this time, $m=0, 1, \ldots, 12N_{RB}^{PDSCH}-1$ and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor n_s/2 \rfloor+1) \cdot (2N_{ID}^{cell}+1) \cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2 \rfloor+1) \cdot (2n_{ID}^{(n_{SCID})}+1) \cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 7

| Layer | [w(0), w(1), w(2), w(3)] |
| --- | --- |
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 8:
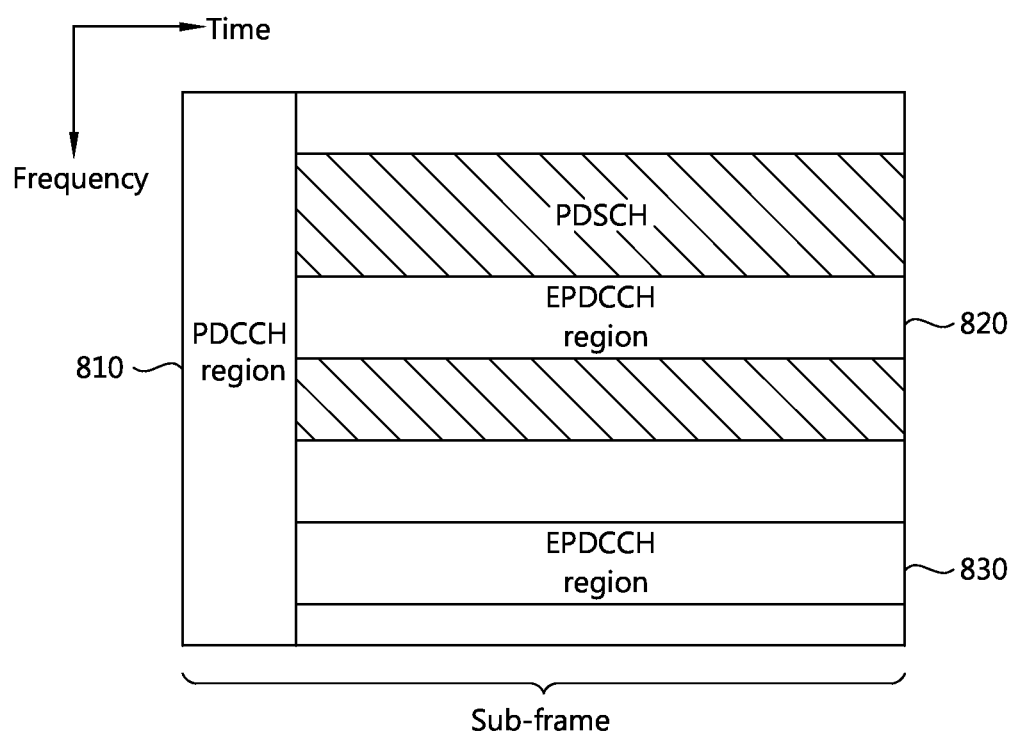
FIG. 8 shows an example of a subframe having an enhanced physical downlink control channel (EPDCCH).

FIG. 8 is a view illustrating an exemplary subframe with EPDCCH.

The subframe may include 0 or 1 PDCCH region 1410 and 0 or more EPDCCH regions 820 and 830.

The EPDCCH regions 820 and 830 are regions where a UE monitors EPDCCH. The PDCCH region 810 is located in preceding 3 or up to 4 OFDM symbols of a subframe, and The EPDCCH regions 820 and 830 may be flexibly scheduled in the OFDM symbols, following the PDCCH region 810.

One or more EPDCCH regions 820 and 830 may be assigned to the UE. The UE may monitor EPDCCH data in the EPDCCH regions 820 and 830 assigned to the UE.

A base station may notify the UE of information on a subframe for monitoring the EPDCCH and/or the number/position/size of the EPDCCH regions 820 and 830 through a radio resource control (RRC) message, and the like.

In the PDCCH region 810, the PDCCH can be demodulated based on CRS. In the EPDCCH regions 820 and 830, DM-RS may be defined rather than CRS for demodulation. The DM-RS may be transmitted in the corresponding EPDCCH regions 820 and 830.

A RS sequence for the DM-RS is expressed in Equation 3. Here, $m=0, 1, \ldots, 12N_{RB}^{max,DL}-1$ and $N_{RB}^{max,DL}$ is the maximum number of RBs. A pseudo-random sequence generator can be initialized as $c_{init}=(\lfloor n_s/2 \rfloor+1) \cdot (2n_{ID,i}^{EPDCCH}+1) \cdot 2^{16}+n_{SCID}^{EPDCCH}$ at the start of each subframe. ns is the number of a slot in a radio frame, $n_{ID,i}^{EPDCCH}$ is a cell index related to the corresponding EPDCCH region, and $n_{SCID}^{EPDCCH}$ is a parameter given from higher-layer signaling.

Each of the EPDCCH regions 820 and 830 may be used in scheduling for different cells. For example, EPDCCH within the EPCCH region 820 can deliver information on scheduling for a primary cell, and EPDCCH within the EPCCH region 830 can send information on scheduling for a secondary cell.

When the EPDCCH is transmitted via multiple antenna in the EPDCCH regions 820 and 830, the same precoding as that of the EPDCCH may be applied to DM-RS in EPDCCH regions 820 and 830.

Considering that the PDCCH uses CCE as a transmission resource unit, a transmission resource unit for the EPDCCH is referred to as Enhanced Control Channel Element (ECCE), An aggregation level may be defined as a resource unit for monitoring the EPDCCH. For example, assuming that 1 ECCE is a minimum resource for the EPDCCH, an aggregation level may be L={1, 2, 4, 8, 16}. A search space may be defined even in the EPDCCH region. The UE can monitor EPDCCH candidates on the basis of the aggregation level.

FIG. 9 shows the concept of a multimedia broadcast single frequency network (MBSFN) subframe.

Referring to an upper portion of FIG. 9, 10 subframes included in one frame 910 may include a normal subframe 950 which is used for transmitting and receiving normal data or an MBSFN subframe 970 which may be used for broadcasting or multicasting. The normal subframe 950 and the MBSFN subframe 970 may be different in terms of the number of OFDM symbols, a CP length, a CRS structure, and the number of CRSs. In the legacy LTE-Rel 8, LTE-Rel 9 system, the MBSFN subframe 970 is used only for the purpose of transmitting broadcast or multicast data. However, ever since LTE-Rel 10, the MBSFN subframe 970 may also be used for the purpose of unicasting which is a data transmission for a specific UE, in addition to the purpose of the broadcasting or the multicasting.

Referring to a lower portion of FIG. 9, as a subframe for transmitting a physical multicast channel (PMCH), the MBSFN subframe may indicate a subframe in which a CRS may not be transmitted in the remaining regions other than a PDCCH region consisting of first two OFDM symbols. The PDCCH region may also be defined as one OFDM symbol.

A UE which is not configured to receive the MBSFN subframe may not receive downlink data in the remaining regions other than the PDCCH region. MBSFN configuration information is information for configuring an MBSFN subframe transmitted from a BS. The MBSFN configuration information may be transmitted through a higher layer signal. For example, the BS may transmit the MBSFN configuration information through system information block (SIB)-2 transmitted through the PDSCH. The MBSFN configuration information may include information such as a bitmap indicating the MBSFN subframe, a radio frame allocation period, a radio frame allocation offset, a subframe allocation, etc.

If the same resource block is assumed, the number of CRSs mapped to a resource block of the MBSFN subframe and the number of CRSs included in a resource block of a normal subframe may have different values from each other. More specifically, the number of $1^{st}$ CRSs mapped to the MBSFN subframe may be less than the number of $2^{nd}$ CRSs mapped to the normal subframe.

In this case, the $1^{st}$ CRS is generated on the basis of a reference signal sequence determined as a pseudo random sequence initialized to $c_{init}=2^{10} \cdot (7 \cdot (n_s+1)+l+1) \cdot (2 \cdot N_{ID}^{cell}+1)+2 \cdot N_{ID}^{cell}+N_{CP}$, $n_s$ is a slot number of the MBSFN subframe, $N_{ID}^{cell}$ is an identifier of a $1^{st}$ serving cell, and $N_{CP}$ may be determined on the basis of a CP length of an OFDM symbol of a slot of the MBSFN subframe.

In addition, the $2^{nd}$ CRS is generated on the basis of a reference signal sequence determined as a pseudo random sequence initialized to $c_{init}=2^{10} \cdot (7 \cdot (n_s+1)+l+1) \cdot (2 \cdot N_{ID}^{cell}+1)+2 \cdot N_{ID}^{cell}+N_{CP}$, $n_s$ is a slot number of the normal subframe, $N_{ID}^{cell}$ is an identifier of the $1^{st}$ serving cell, and $N_{CP}$ may be determined on the basis of a CP length of an OFDM symbol of a slot of the normal subframe.

Figure 10:
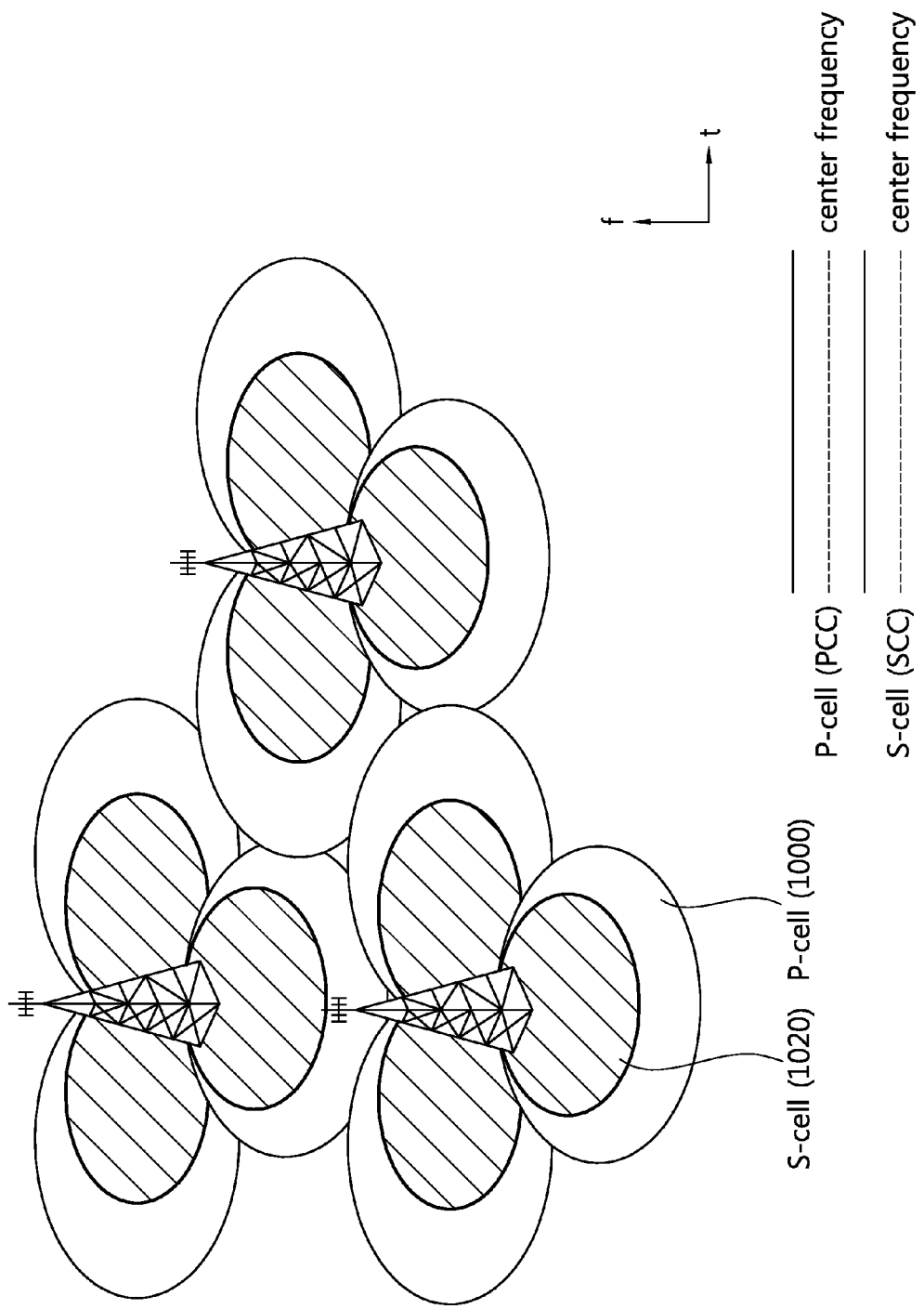
FIG. 10 shows the concept of a primary (P)-cell and a secondary (S)-cell.

FIG. 10 shows the concept of a P-cell and an S-cell.

In FIG. 10, for convenience of explanation, one of deployment scenarios of the P-cell and the S-cell is described for example. The P-cell and the S-cell may be implemented in various manners. In general, the P-cell and the S-cell may indicate a cell in which a center frequency is distinguished from other frequencies.

Referring to FIG. 10, a base station can perform carrier aggregation based on PCC of the P-cell 1000 and one or more SCC of the S-cell 1020. When 2 cells or more exist, the base station can determine one cell as the P-cell 1000 and determine another cell as S-cell 1520. The base station may transmit data to a UE by using aggregated frequency bandwidth, after aggregating CC of the determined P-cell 1000 and S-cell 1020. The UE also can transmit data to the base station by using aggregated frequency bandwidth. The P-cell 1500 and S-cell 1020 of FIG. 10 is an example of a scenario where the P-cell 1000 and S-cell 1020 are arranged, where a transmission range of data on the basis of PCC is greater than that of data on the basis of SCC.

The UE can perform radio resource control (RRC) connection through the PCC. Furthermore, the UE can attempt random access to the base station through a physical random access channel (PRACH) based on a signal which is signaled through the PCC. That is, the UE can perform initial connection establishment or connection re-establishment process to the base station through the PCC in carrier aggregation environment.

The SCC of the S-cell 1020 may be used for providing additional radio resources. In order to perform carrier aggregation by which SCC is aggregated to PCC, the UE needs to perform neighbor cell measurement for acquiring information on the neighbor cells. The base station can determine whether to aggregate the SCC to the PCC according to the result of the neighbor cell measurement.

The base station can transmit PDCCH data through the PCC to the UE. The PDCCH data may include information on allocation of PDSCH data to be transmitted via a downlink PCC bandwidth and SCC bandwidth, and information on approval of data transmission via an uplink.

The P-cell 1000 and the S-cell 1020 may perform carrier aggregation through configuration and activation and transmit and receive data through an aggregated frequency bandwidth.

FIG. 11 shows the concept of a protocol for supporting a multimedia broadcast multicast service (MBMS).

In FIG. 11, the protocol for supporting the MBMS may be defined for an MBMS user plane and an MBMS control plane.

A broadcast multicast service center (BM-SC) 1100 performs authentication verification and service start for MBMS bearer services. In addition, the BM-SC 1100 serves for scheduling and transmitting in consideration of service quality for an MBMS content. The BM-SC 1100 may deliver its broadcast content through an LTE network or may relay a broadcast content by interworking with an external content server. The BM-SC 1100 may use an SGmb interface to exchange a control message and an SGi-mb interface to transmit a user traffic (content) with respect to an MBMS-gateway (GW) 1120. The MBMS-GW 1120 performs a control (service start/end) function for an MBMS session and delivers a content to an eNB 1130 by using an IP multicast transmission scheme. The MBMS-GW 1120 may use an Sm interface to exchange a control message for a session and an M1 interface to deliver a user traffic to the eNB 1130 with respect to a mobility management entity (MME).

The MME 1160 serves to control an MBMS session, and has an M3 interface with respect to a multi-cell/multicast coordinate entity (MCE) 1170 for a connection with the MCE 1170 and the MBMS-GW 1120. The MCE 1170 may perform a management for a radio resource and an admission control for an MBMS service with respect to the eNBs 1130 belonging to the MCE 1170. The MCE 1170 determines a modulation and coding scheme (hereinafter, MCS) for MBMS services and performs a control for an MBMS session.

The eNB 1130 performs an allocation of an actual radio resource for broadcast services scheduled in the MCE 1170 and performs a transmission synchronized for the MBMS services. The MCE 1170 has an M2 interface to deliver a control signal with respect to the eNB 1130. A UE 1150 performs a reception for synchronized MBMS data. The MCE 1170 may be physically separated from the eNB 1130 as a logical node having a radio access function such as the eNB 1130 and thus may manage a radio resource in a centralized manner, or may be separated from each eNB 1130 in a distributed manner and may have a structure in which one eNB 1130 is a master and the MCE 1170 of the remaining eNBs 1130 is a slave.

In the protocol structure of the user plane for the MBMS, the MBMS packet generated in the BM-SC 1100 may be delivered to the MBMS-GW 1120 through tunneling of a packet including SYNC information to perform a synchronized transmission of a radio duration. The MBMS-GW 1120 delivers the SYNC information to the eNB 1130 in an IP multicast transmission manner. The eNB 1130 transmits a synchronized packet to the UE 1150 on the basis of the SYNC information. A SYNC protocol has information to be used by the eNB 1130 for a synchronized transmission in a radio duration. The SYNC protocol may be used to know whether a loss occurs in packets transmitted from the BM-SC 1100. In the MBMS, since the UE 1150 must equally maintain a state of a PDCP even if a cell is changed in an MBSFN region, a PDCP layer is located in the BM-SC 1100 unlike in the unicasting case.

The UE may support the MBMS in an RRC_IDLE and RRC_CONNECTED state. Hereinafter, an operation of supporting the MBMS in the RRC_IDLE and RRC_CONNECTED state of the UE is described.

In the RRC_IDLE state, the UE may perform the following operation.

The UE in the RRC_IDLE state is configured to a UE-specific discontinuous reception (DRX) by a higher layer. In addition, in the RRC_IDLE state, the UE may perform a UE-controlled mobility. In the RRC_IDLE state, the UE monitors a paging channel for detecting an incoming call, a system information change, an earthquake and tsunami warning system (ETWS) notification for an ETWS-capable UE, and a commercial mobile alert service (CMAS) notification. In addition, in the RRC_IDLE state, a neighboring cell measurement and a cell (re)selection are performed, and system information is acquired by the operation of the UE.

In the RRC_CONNECTED state, the UE may perform the following operation.

In the RRC_CONNECTED state, the UE may perform an operation of transmitting unicast data and an operation of receiving the unicast data. In addition, the UE may be configured to a UE-specific DRX by a lower layer. For a UE supporting a carrier aggregation, a P-cell and aggregated one or more S-cells may be used for an increased bandwidth. As a network-controlled mobility, a cell change command may be performed together with, for example, a handover for GERAN and an optional network assistance (NACC) for the GERAN.

In the RRC_CONNECTED state, the UE may monitor a system information change, an ETWS notification for an ETWS-capable UE(s), a paging channel for detecting a CMAS notification for a CMAS-capable UE(s), and/or system block type 1 contents. In addition, the UE monitors a control channel associated with a data channel shared to detect whether data is scheduled in the UE. The UE provides channel quality and feedback information, and performs neighboring cell measuring and measurement reporting. In addition, the UE may acquire system information.

A multicast control channel (MCCH) which is a logical channel for transmitting control information of MBMS may have the following characteristics.

The MCCH is configured with a single MBSFN area configuration RRC message. The single MBSFN area configuration RRC message performs listing on all MBMS services together with an ongoing session and an optional MBMS counting request message. The MCCH is transmitted to the UE by all cells in an MBSFN area other than an MBSFN area reserved cell. The MCCH is transmitted by RRC in every MCCH repetition period. The MCCH may be transmitted through a changed period. A notification mechanism may be used to indicate a change of the MCCH due to a session start or a presence of an MBMS counting request message. An MCCH information change notification may be transmitted periodically through an MBSFN subframe in a change duration which exists before a change of the MCCH. A DCI format 1C masked with an M-RNTI may be used for the MCCH information change notification, and the DCI format 1C masked with the M-RNRI may include an 8-bit bitmap for indicating one or more MBSFN areas in which the MCCH is changed. The UE may monitor a subframe including one or more pieces of MCCH information change notification information for each change period. If the UE receives the MCCH information change notification, the UE may acquire the MCCH in a next modification period boundary.

If the MCCH information is changed, a method of transmitting the change of the MCCH information to the UE may be performed in the following manner.

The change of the MCCH information may occur only in a specific radio frame. The same MCCH information may be transmitted several times with an MCCH repetition period within an MCCH change duration. In a PDCCH, an indication of an MBMS specific RNTI (M-RNTI) may be used to report the change of the MCCH information to the UE in the RRC_IDLE state and the UE in the RRC_CONNECTED state. In the PDCCH, an MCCH information change notification may be transmitted periodically or may be transmitted through an MBSFN subframe. The MBMS-capable RRC_IDLE UE or RRC_CONNECTED UE can acquire the MCCH information.

System information received by the UE in regards to the MBMS may be transmitted similarly to SIB 13 of Table 10 below or SIB 15 of Table 11 below.

TABLE 10

| SystemInformationBlockType13-r9 | ::= SEQUENCE { | |
|---|---|---|
| mbsfn -AreaInfoList -r9 | MBSFN -AreaInfoList-r9, | |
| notificationsConfig-r9 | MBMS-NotificationConfig-r9, | |
| lateNonCriticalExtension | OCTET STRING | OPTIONAL, -- Need OP |
| ... | | |
| } | | |

Referring to Table 10, the SIB 13 may include information required to acquire MBMS control information related to one or more MBSFN areas.

Mbsfn-AreaInfoList may include information on an MBSFN area identifier, information on an MCCH change period, an MCCH offset, and information on an MCCH repetition period.

MBMS-NotificationConfig may include information on a radio frame in which the MCCH information change notification is scheduled.

TABLE 11

| SystemInformationBlockType15-r11 | ::= SEQUENCE { | |
|---|---|---|
| sai-IntraFreq-r11 | MBMS-SAI-List-r11 | OPTIONAL, -- Need OR |
| sai-InterFreqList-r11 | MBMS-SAI-InterFreqList-r11 | OPTIONAL, -- Need OR |

TABLE 11-continued

| | | |
|---|---|---|
| lateNonCriticalExtension<br>Need OP<br>. . .<br>} | OCTET STRING | OPTIONAL, -- |
| MBMS-SAI-List-r11 ::=<br>r11 | SEQUENCE (SIZE (1..maxSAI-MBMS-r11)) OF MBMS-SAI- | |
| MBMS-SAI-r11::= | INTEGER (0..65535) | |
| MBMS-SAI-InterFreqList-r11 ::=<br>InterFreq-r11 | SEQUENCE (SIZE (1..maxFreq)) OF MBMS-SAI- | |
| MBMS-SAI-InterFreq-r11 ::=<br>  dl-CarrierFreq<br>  sai-List-r11<br>. . .<br>} | SEQUENCE {<br>  ARFCN-ValueEUTRA,<br>  MBMS-SAI-List-r11, | |

Referring to FIG. 11, the SIB 15 may include MBMS service area identities (SAIs) of a current and/or neighboring carrier frequency.

sai-Inter-FreqList includes a list of neighboring frequencies for providing an MBMS service and a corresponding MBMS SAI. sai-InterFreq includes a list of MBMS SAIs for a current frequency. sai-List includes a list of MBMS SAIs for a specific frequency.

A positioning service implies a service for providing information on a geographical location of the UE. An LTE system defines a protocol between the UE and a location information server to support a location information service.

Figure 12:
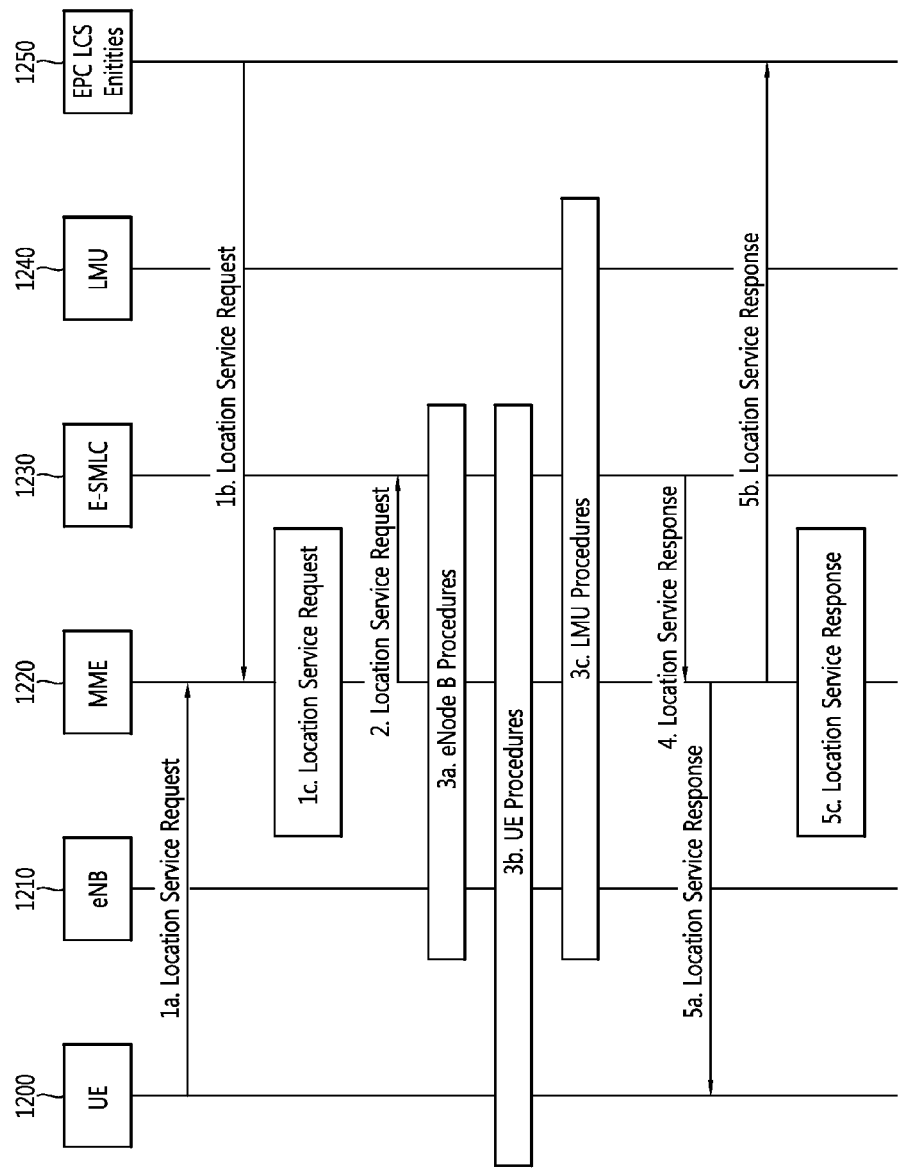
FIG. 12 shows the concept of an operation between a user equipment and a location information server.

FIG. 12 shows the concept of an operation between a UE and a location information server.

Referring to FIG. 12, the location information service may start in such a manner that a UE 1200 requests an MME 1220 to provide a location service, or a specific entity (e.g., a gateway mobile location center (GMLC) 1250) in an enhanced packet core (EPC) requests the MME 1220 to provide a location service of a specific UE, or the MME 1220 requests a location service for an emergency call or the like.

After the location information service is requested by the UE 1200, the MME 1220 may transmit a positioning service request message to an evolved serving mobile location center (E-SMLC) 1230. Upon receiving the positioning service request message, the E-SMLC 1230 starts a positioning service related procedure with respect to a serving eNB 1210 of the UE 1200 to acquire measurement or assistance data for a positioning service. Additionally or alternatively to such a procedure, the E-SMLC 1230 may start a procedure for directly acquiring a measurement with respect to the UE 1220.

For the positioning service using an uplink, additionally to the start of the procedure of the positioning service, a positioning service procedure may start with respect to a location measurement unit (LMU) 1240 of the UE 1200 together with the eNB 1210. On the basis of the positioning service related measurement acquired as such, the E-SMLC 1230 transmits a location service response message for the UE 1200 to the MME 1220. Thereafter, the MME 1220 provides location information to the UE 1200 or provides the location information to the specific entity 1250 in the EPC, or delivers a related emergency call to the GMLC.

FIG. 13 shows the concept of a positioning reference signal (PRS).

A PRS for a normal CP case and a PRS for an extended CP case are described in FIG. 13.

A left portion of FIG. 13 shows resource mapping of a PRS in a resource block pair (RBP) when using a normal CP. An upper left portion shows a case where one or two PBCH antenna ports are used, and a lower left portion shows a case where four PBCH antenna ports are used.

A right portion of FIG. 13 shows resource mapping of a PRS in an RBP when using an extended CP. An upper right portion shows a case where two PBCH antenna ports are used, and a lower right portion shows a case where four PBCH antenna ports are used.

The PRS may be transmitted to a UE through a PRS subframe which is a specific subframe configured to transmit the PRS among a plurality of subframes. Hereinafter, a downlink subframe configured to transmit the PRS is expressed as a 'PRS subframe'. A CP length of an OFDM symbol constituting the PRS subframe may be determined according to whether an MBSFN subframe is configured as the PRS subframe.

If both of a normal subframe and an MBSFN subframe are configured as PRS subframes in a cell, a CP of an OFDM symbol configured to transmit a PRS in the MBSFN subframe may have the same length as a CP length of an OFDM symbol of a subframe #0. The subframe #0 indicates a subframe which is temporally the most preferential in one frame. If only the MBSFN subframe is configured as the PRS subframe in the cell, the CP of the OFDM symbol configured to transmit the PRS in the MBSFN subframe may be an extended CP.

If the CP of the PRS subframe is configured in this manner, a CP length of an OFDM symbol constituting a control channel on the PRS subframe and a CP length of an OFDM symbol constituting a traffic channel on the PRS subframe may be different from each other. In addition, the CP length of the OFDM symbol constituting the control channel and the CP length of the OFDM symbol constituting the traffic channel may be equal to each other. The PRS may be transmitted by being defined as an antenna port 6.

A reference signal sequence $r_{l,n_s}(m)$ of the PRS may be determined on the basis of the aforementioned Equations 3 and 4.

As a complex value, the reference signal sequence $r_{l,n_s}(m)$ may be mapped to a modulated symbol $a_{k,l}^{(p)}$ used as a reference signal in the antenna port 6 of a slot ns. Herein, k and l may be mapped as shown in an upper portion and a low portion of FIG. 14 by being configured in the following manner.

In a normal CP case, the PRS may be subjected to resource mapping on the basis of k and l defined by Equation 5 below.

$$k = 6(m + N_{RB}^{DL} - N_{RB}^{PRS}) + (6 - l + v_{shift}) \bmod 6 \quad \langle\text{Equation 5}\rangle$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In an extended CP case, the PRS may be subjected to resource mapping on the basis of k and l defined by Equation 6 below.

$$k = 6(m + N_{RB}^{DL} - N_{RB}^{PRS}) + (5 - l + v_{shift}) \bmod 6 \quad \text{(Equation 6)}$$

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ PBCH antenna ports}) \\ 2, 4, 5 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In Equation 5 and Equation 6, a frequency bandwidth $N_{RB}^{PRS}$ at which the RPS is transmitted may be configured in a higher layer, and a cell-specific frequency shift may be configured as $v_{shift} = N_{ID}^{cell} \bmod 6$.

In a cell, a PRS subframe may be configured on the basis of $T_{PRS}$ which is a cell-specific PRS transmission period and $\Delta_{PRS}$ which is a cell-specific subframe offset. The cell-specific PRS transmission period, i.e., $T_{PRS}$, and the cell-specific subframe offset, i.e., $\Delta_{PRS}$, may be determined on the basis of a PRS configuration index $I_{PRS}$ configured in the higher layer. Table 12 below shows a PRS configuration based on the PRS configuration index $I_{PRS}$.

TABLE 12

| PRS configuration Index $I_{PRS}$ | PRS periodicity $T_{PRS}$ (subframes) | PRS subframe offset $\Delta T_{PRS}$ (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | Reserved |

As described above, a CP length of an OFDM symbol for transmitting a PRS in a PRS subframe may vary depending on a configuration of the PRS subframe. That is, the CP length of the OFDM symbol for transmitting the PRS may vary depending on whether the PRS subframe is configured simultaneously in a normal subframe and an MBSFN subframe or is configured only in the MBSFN subframe.

In a special case, a UE may not decode PDSCH data transmitted through a PRS subframe. For example, if the UE is set to a transmission mode 9 or 10 and a BS transmits PMCH data through a subframe configured to MBSFN in a higher layer, the UE does not decode the PDSCH. In addition, if the PRS subframe and a subframe #0 have different CP lengths, the UE does not decode PDSCH data corresponding to control information transmitted through a PDCCH scrambled with C-RNRI or SPS C-RNTI.

The PRS subframe may be transmitted in a P-cell and/or an S-cell irrespective of a carrier aggregation configuration. If an intra-band contiguous carrier aggregation is performed among combinations of bands supporting a carrier aggregation, the BS may transmit data through a subframe on the P-cell and/or the S-cell or may receive the data through the subframe on the P-cell and/or the S-cell. The intra-band contiguous carrier aggregation implies a carrier aggregation for a plurality of bands which are not discontiguous but contiguous.

Hereinafter, an embodiment of the present invention discloses a method of transmitting a PRS subframe of a BS and a method of receiving a PRS subframe of a UE in an LTE system supporting an intra-band contiguous carrier aggregation based on single FFT/IFFT. In the embodiment of the present invention described below, it is assumed that a $1^{st}$ cell and a $2^{nd}$ cell perform the intra-band contiguous carrier aggregation. For example, the $1^{st}$ cell may be a P-cell, and the $2^{nd}$ cell may be an S-cell.

Figure 14:
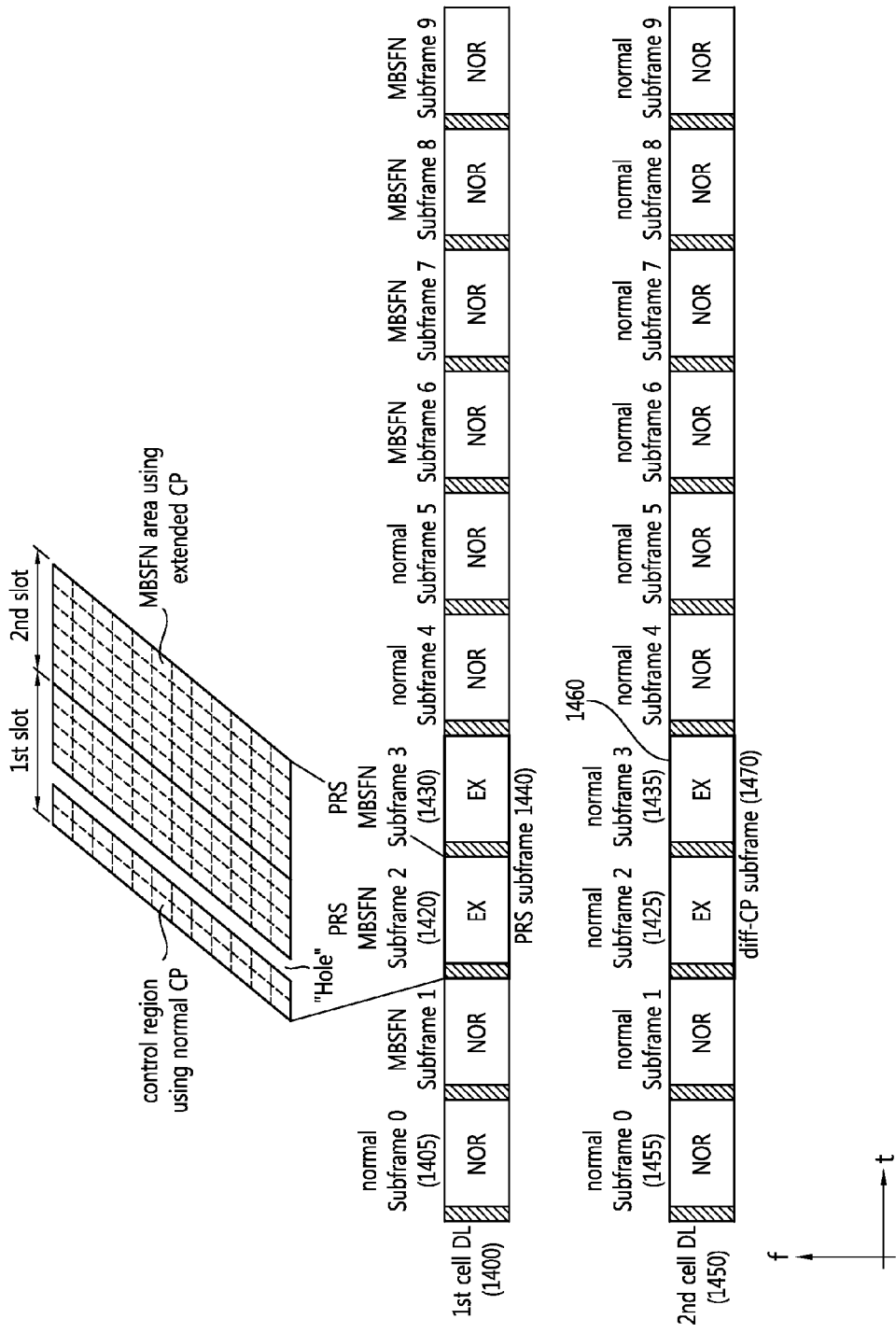
FIG. 14 shows the concept of a method of transmitting a positioning reference signal (PRS) subframe according to an embodiment of the present invention.

FIG. 14 shows the concept of a method of transmitting a PRS subframe according to an embodiment of the present invention.

An upper portion of FIG. 14 shows a PRS subframe 1440 on a $1^{st}$ cell 1400.

Referring to the upper portion of FIG. 14, a frame on the $1^{st}$ cell 1400 may include a normal subframe and an MBSFN subframe. In addition, the PRS subframe may be configured only in the MBSFN subframe transmitted on the $1^{st}$ cell 1400. The MBSFN subframe may be configured in at least one of subframes #1, #2, #3, #6, #7, and #8 in a frame. Hereinafter, it is assumed in FIG. 14 that the PRS subframe is configured in the subframe #2 1420 and the subframe #3 1430 which are MBSFN subframes.

In addition, it is assumed that a subframe #0 1405 which is a normal subframe uses a normal CP. In FIG. 14, 'NOR' indicates a normal CP, and 'EX' indicates an extended CP.

If both of the normal subframe and the MBSFN subframe are configured as PRS subframes in one frame as described above, a CP length of an OFDM symbol for transmitting a PRS may be configured to be equal to a CP length of a CP used in a subframe #0. In addition, if only the MBSFN subframe is configured as the PRS subframe in one frame, an OFDM symbol for transmitting the PRS in an MBSFN area of the MBSFN subframe may use an extended CP. More specifically, the PRS subframe may be configured as the MBSFN subframe, and the remaining subframes other than the PRS subframe among a plurality of subframes included in the frame including the PRS subframe may be configured as a normal subframe. If the same resource block is assumed as described above, the number of 1st CRSs mapped to one resource block on the MBSFN subframe may be less than the number of $2^{nd}$ CRSs mapped to one resource block on the normal subframe.

In FIG. 14, only the subframe #2 1420 and the subframe #3 1430 which are MBSFN subframes are configured as PRS subframes. Accordingly, an OFDM symbol for transmitting a PRS in an MBSFN area on the MBSFN subframe may be an extended CP. That is, a CP of an OFDM symbol constituting an MBSFN area of the PRS subframe 1440 may be an extended CP.

A lower portion of FIG. 14 shows a frame on a $2^{nd}$ cell 1450. If it is assumed that the $1^{st}$ cell 1400 and the $2^{nd}$ cell 1450 have already performed an intra-band contiguous carrier aggregation as described above, an OFDM symbol temporally associated in the $1^{st}$ cell 1400 and the $2^{nd}$ cell 1450 may be a symbol generated by performing single IFFT in a BS. Examples of a combination capable of performing the intra-band contiguous carrier aggregation may include 10 MHz+10 MHz, 10 MHz+15 MHz, 10 MHz+20 MHz, 15 MHz+15 MHz, 15 MHz+20 MHz, 20 MHz+20 MHz, etc.

Since the single IFFT is performed in the $1^{st}$ cell and the $2^{nd}$ cell, an OFDM symbol of a subframe 1470 on the $2^{nd}$ cell 1450 temporally associated with the PRS subframe 1440 on the $1^{st}$ cell 1400 may include an extended CP.

If the single IFFT is performed on different cells, a CP length of an OFDM symbol generated as a result of the single IFFT may be defined as the same length. That is, a CP length of an OFDM symbol of the PRS subframe 1440 on the $1^{st}$ cell 1400 and a CP length of an OFDM symbol of the PRS subframe 1470 on the $2^{nd}$ cell 1450 may be defined as the same length.

In this case, another subframe included in a frame on the $2^{nd}$ cell may be a subframe having an OFDM symbol of a normal CP, and the subframe 1470 of the $2^{nd}$ cell 1450 temporally associated with the PRS subframe on the $1^{st}$ cell may be a subframe having an OFDM symbol of an extended CP.

That is, since the single IFFT is performed, an OFDM symbol of an extended CP may be included unlike another subframe included in the same frame in the subframe 1460 which is a part of subframes on the $2^{nd}$ cell 1450. That is, a plurality of subframes included in the frame of the $2^{nd}$ cell 1450 may be subframes including OFDM symbols of different CPs.

Hereinafter, an embodiment of the present invention discloses an operation of a UE or a BS for a case where a CP length of an OFDM symbol included in a PRS subframe on a specific cell is different from a CP length of an OFDM symbol included in another subframe and also where a CP length of an OFDM symbol included in a subframe on a specific cell is different from a CP length of an OFDM symbol included in another subframe is different due to single IFFT.

A subframe of a $2^{nd}$ cell may be generated together with a PRS subframe on a $1^{st}$ cell on the basis of the single IFFT. If a CP length of an OFDM symbol included in the generated subframe of the $2^{nd}$ cell is different from a CP length of an OFDM symbol included in a subframe #0 (i.e., a $1^{st}$ subframe of a frame), the generated subframe of the $2^{nd}$ cell may be expressed as a different CP (diff-CP) subframe. In case of performing the single IFFT, a CP length of an OFDM symbol included in a subframe #0 of the $1^{st}$ cell may be the same as the CP length of the OFDM symbol included in the subframe #0 of the $2^{nd}$ cell. Therefore, the subframe #0 may be a subframe on the $1^{st}$ cell or the $2^{nd}$ cell. That is, the diff-CP subframe may be generated when the CP length of the OFDM symbol included in the PRS subframe is different from the CP length of the subframe #0.

For example, as shown in FIG. 14, among subframes transmitted in the $2^{nd}$ cell which performs an intra-band contiguous carrier aggregation with respect to the $1^{st}$ cell, subframe 1425 or 1435 which is a subframe defined as a CP length (extended CP) of an OFDM symbol different from a CP length (normal CP) of an OFDM symbol included in the subframe #0 1455 may be referred to as the diff-CP subframe 1470.

From a perspective of a UE, the diff-CP subframe 1470 may be a subframe having a CP length different from a CP length of an OFDM symbol which is expected to be included in a subframe on a specific cell (e.g., the $2^{nd}$ cell 1450). For example, upon receiving the subframe #2 1425 and the subframe #3 1435 from the $2^{nd}$ cell 1450, the UE may expect that downlink data such as PDSCH data and EPDCCH data will be transmitted through the subframes #2 and #3 configured to a normal CP similarly to the subframe #0 1455. However, if downlink channel data and signals are transmitted through diff-CP subframes, downlink data may be transmitted through an OFDM symbol having a CP length different from a UE's CP length estimated by the UE on the basis of the subframe #0 1455. In this case, when using the diff-CP subframe, the UE cannot receive data and/or signals transmitted through a downlink channel such as a PDSCH due to a change in a CP length.

According to an embodiment of the present invention, the UE may not perform decoding on traffic data transmitted through the diff-CP subframe 1470. For example, if the UE receives the diff-CP subframe 1470 from the $2^{nd}$ cell 1450, decoding may not be performed on data transmitted through a downlink channel such as a PDSCH and an EPDCCH on the diff-CP subframe 1470.

Similarly to a case where the UE does not decode downlink data transmitted through a diff-CP subframe on an S-cell, a CP length of an OFDM symbol included in a PRS subframe on the $1^{st}$ cell may be different from a length of an OFDM symbol included in the subframe #0. In this case, the UE may not decode a PDSCH transmitted through the PRS subframe.

If the PRS subframe is configured only in the MBSFN subframe as described above, the CP length of the OFDM symbol included in the PRS subframe on the $1^{st}$ cell may be different from the CP length of the OFDM symbol included in the subframe #0. In this case, the UE may not decode downlink data transmitted through the PRS subframe. In addition, if a CP length of an OFDM symbol included in a subframe temporally associated with the PRS subframe is different from a CP length of a subframe #0 of the $2^{nd}$ cell (i.e., a diff-CP subframe), the UE may not decode downlink data transmitted through the diff-CP subframe included in a frame on the $2^{nd}$ cell.

For convenience of explanation, it is described by assuming a case where the frame on the $2^{nd}$ cell 1450 includes the diff-CP subframe. However, on the contrary, a frame on the $2^{nd}$ cell 1450 may include a PRS frame, and a frame on the $1^{st}$ cell 1400 may include a diff-CP subframe. The UE may not decode PDSCH data and EPDCCH data transmitted through the diff-CP subframe on the $1^{st}$ cell.

For example, if the PRS subframe is configured only in the MBSFN subframe on the $2^{nd}$ cell, the CP length of the OFDM symbols included in the PRS subframe on the $2^{nd}$ cell may be different from the CP length of the OFDM symbol included in the subframe #0. In this case, the UE may not decode downlink data transmitted through the PRS subframe. In addition, the UE may not decode downlink data transmitted to the diff-CP frame on the $1^{st}$ cell.

In one embodiment of the present invention, it may be assumed a case where downlink data is transmitted through a PDSCH and an EPDCCH of a data subframe on the $1^{st}$ cell, and a PRS subframe is transmitted on the $2^{nd}$ cell. The data subframe is used as a term which implies a subframe transmitted on the $1^{st}$ cell. In this case, the UE may determine whether to decode downlink data transmitted through a PDSCH and an EPDCCH on a data subframe.

First, the UE receives downlink data transmitted through a data subframe transmitted on the $1^{st}$ cell (or $1^{st}$ serving cell). In addition, the UE may receive configuration information regarding a plurality of PRS subframes for transmitting a PRS. The UE may determine whether to decode the downlink data transmitted through the PDSCH and the EPDCCH on the data subframe according to the received configuration information. If a $1^{st}$ cyclic prefix (CP) length of the data subframe is different from a CP length of a $1^{st}$ subframe of a 1$^{st}$ frame including the data subframe, the UE may give up the decoding of the data transmitted through the PDSCH and the EPDCCH on the data subframe. In this case, the data subframe transmitted from the 1$^{st}$ cell may be a subframe received in an overlapping manner temporally with at least one PRS subframe, as a subframe generated based on the same IFFT as that of at least one PRS subframe among a plurality of PRSs.

In addition, the UE may determine whether to decode the data transmitted through the PDSCH and the EPDCCH on the PRS subframe according to the configuration information, and in this case, if a 2$^{nd}$ CP length of the PRS subframe is different from a CP length of a 1$^{st}$ subframe of a 2$^{nd}$ frame including the PRS subframe, the UE may give up decoding of the data transmitted through the PDSCH and the EPDCCH on the PRS subframe.

Figure 15:
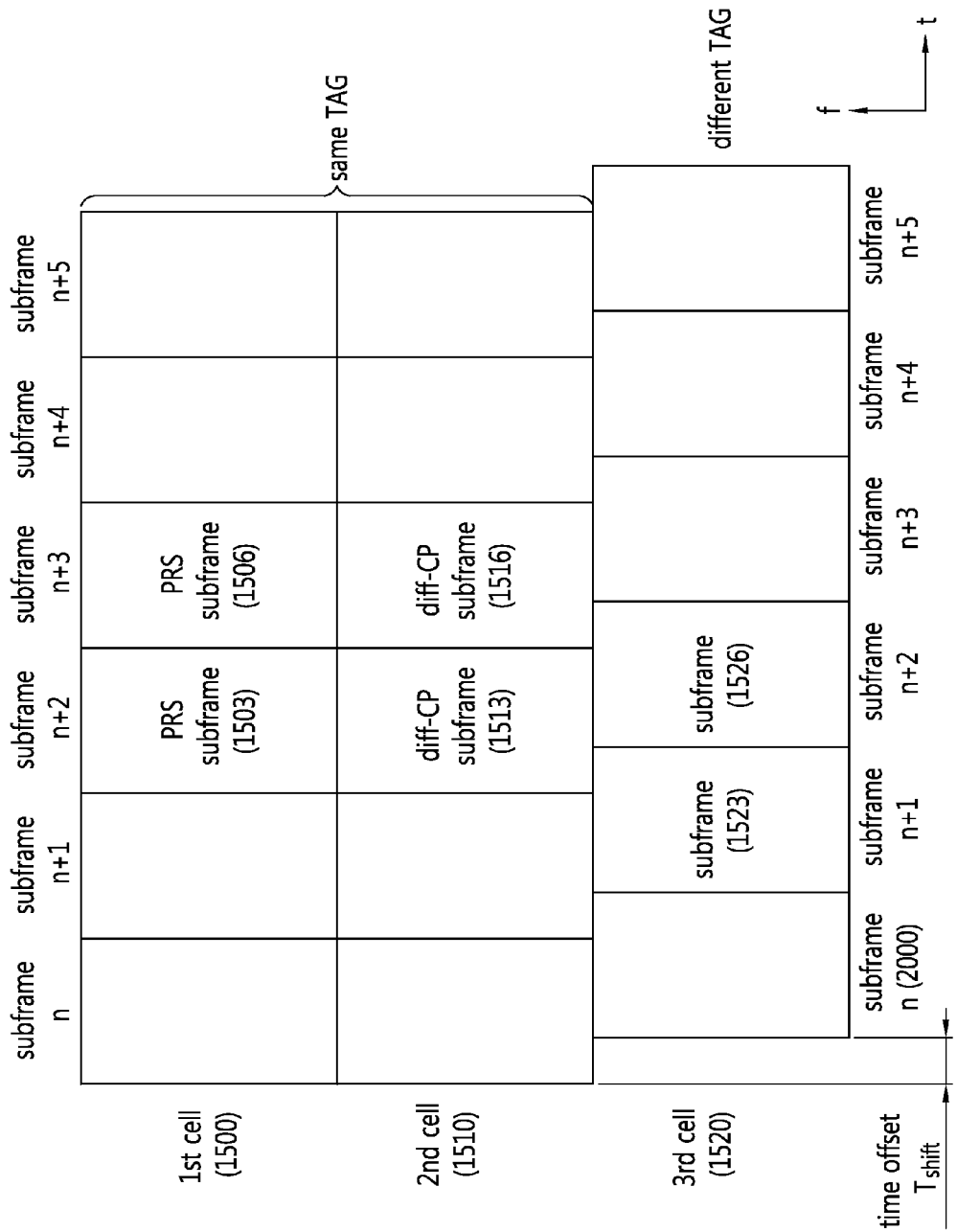
FIG. 15 shows the concept of a method of decoding a subframe by a user equipment on the basis of a timing advanced group (TAG) configuration of a base station according to an embodiment of the present invention.

FIG. 15 shows the concept of a method of decoding a subframe by a UE on the basis of a timing advanced group (TAG) configuration of a BS according to an embodiment of the present invention.

The BS may manage carriers having the same or similar uplink timing by grouping the carriers. A group of the carriers having the similar uplink timing may be referred to as a timing advanced group (hereinafter, TAG). For example, a case where four cells (i.e., a 1st cell, a 2$^{nd}$ cell, a 3$^{rd}$ cell, and a 4$^{th}$ cell) are defined may be assumed. If the 1$^{st}$ cell and the 2$^{nd}$ cell have similar uplink timing, the 1$^{st}$ cell and the 2$^{nd}$ cell may be configured as the same TAG group. In addition, if the 3$^{rd}$ cell and the 4$^{th}$ cell have similar uplink timing, the 3$^{rd}$ cell and the 4$^{th}$ cell may be configured as the same TAG group. A cell included in the same TAG group may be a cell which performs single IFFT/FFT.

As shown in FIG. 14, decoding may not be performed on downlink data transmitted through a PRS subframe or a diff-CP subframe on a specific cell according to a CP length.

According to another embodiment of the present invention, whether to decode a PDSCH to be transmitted through a PRS subframe of a diff-CP subframe may be determined according to the TAG by classifying the received subframes depending on each TAG.

Referring to FIG. 15, a 1$^{st}$ cell 1500, a 2$^{nd}$ cell 1510, and a 3$^{rd}$ cell 1520 may be an intra-band carrier aggregated cell. Among them, it may be assumed a case where the 1$^{st}$ cell 1500 and the 2$^{nd}$ cell 1520 belong to the same TAG group.

PRS subframes 1503 and 1506 may be transmitted on the 1$^{st}$ cell 1500, and diff-CP subframes 1513 and 1516 may be transmitted on the 2$^{nd}$ cell included in the same TAG. That is, the 1$^{st}$ cell 1500 and the 2$^{nd}$ cell 1510 may be cells for performing single FFT/IFFT.

On the other hand, like in the 2$^{nd}$ cell 1520, in case of a cell having a TAG different from that of the 1$^{st}$ cell 1500, subframes 1523 and 1526 may be generated without having to simultaneously perform the FFT/IFFT on the PRS subframes 1513 and 1516.

Like the 2$^{nd}$ cell 1510, in case of the diff-CP subframes 1513 and 1516 which are transmitted on a cell belonging to the same TAG as the 1$^{st}$ cell 1500, the UE may not perform decoding. For example, the UE may not perform decoding on data transmitted through a downlink channel such as a PDSCH and an EPDCCH on the diff-CP subframe 1513 and 1516 transmitted through the 2$^{nd}$ cell 1510. That is, the UE may not perform monitoring on a channel transmitted through the diff-CP subframes 1513 and 1516.

On the other hand, the 3$^{rd}$ cell 1520 may not be included in the same TAG as that of the 1$^{St}$ cell 1500 transmitted in the PRS subframe. Therefore, the UE may perform decoding on downlink data transmitted through the subframes 1523 and 1526 transmitted on the 3$^{rd}$ cell 1520. That is, according to the embodiment of the present invention, decoding may be performed on a downlink channel and a signal transmitted through a subframe transmitted on a cell of which TAG is not the same as that of a cell in which a diff-CP subframe is generated.

In addition, according to the embodiment of the present invention, in another method, the diff-CP subframe may be prevented from being generated, by configuring subframes for transmitting a PRS to be identical in the 1$^{st}$ ell and the 2$^{nd}$ cell.

Figure 16:
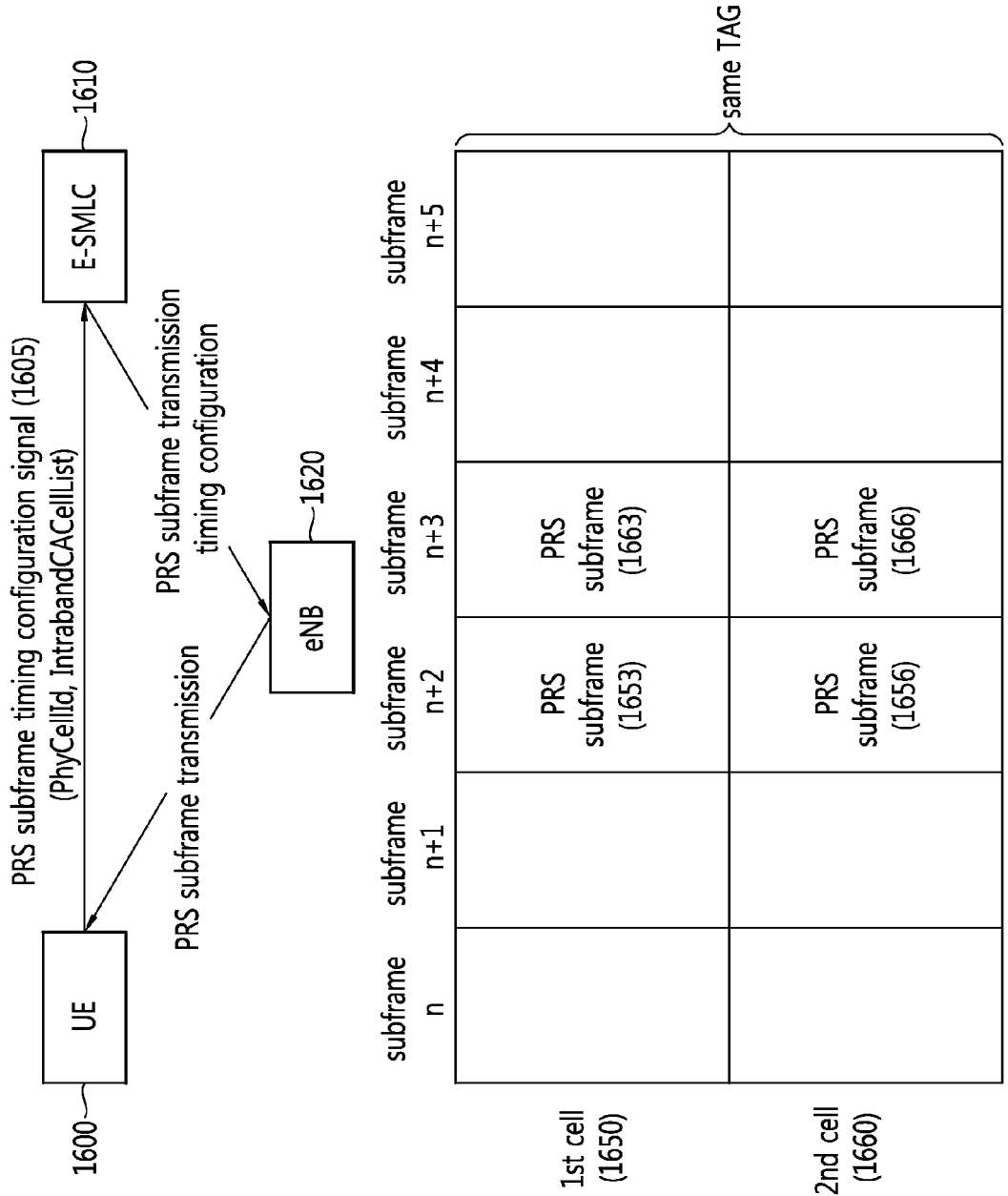
FIG. 16 shows the concept of a method of transmitting a PRS subframe in a cell which performs a carrier aggregation according to an embodiment of the present invention.

FIG. 16 shows the concept of a method of transmitting a PRS subframe in a cell which performs a carrier aggregation according to an embodiment of the present invention.

Referring to FIG. 16, PRS subframes 1653, 1656, 1663, and 1666 on a P-cell 1650 and an S-cell 1660 may be transmitted in the same timing. To adjust transmission timing of the PRS subframes 1653, 1656, 1663, and 1666 on the P-cell 1650 and the S-cell 1660, a signal 1605 may be transmitted to an E-SMLC 1610 to allow PRS subframes of the two cells to be identical. Such a signal may be referred to as a PRS subframe timing configuration signal 1605. The PRS subframe timing configuration signal 1605 may be transmitted from a UE 1600, an eNB 1620, or an MME to the E-SMLC 1610.

For example, if it is assumed that the UE 1600 transmits the PRS subframe timing configuration signal 1605, the UE 1600 may transmit information regarding which cells are implemented with single FFT/IFFT when a physical cell ID is transmitted to the E-SMLC 1610. The information regarding which cells are implemented with the single FFT/IFFT may have, for example, a bitmap format.

Table 13 below shows a physical cell ID implemented with the single FFT/IFFT and a cell list for which an intra-band carrier aggregation is performed.

TABLE 13

```
OTDOA-RequestAssistanceData ::= SEQUENCE {
    physCellId            INTEGER (0..503),
    ...
    IntrabandCACellList bitmap
}
```

Referring to Table 13, among cells enumerated as a physical cell ID (physCellId), a list of cells implemented with single FFT/IFFT may be transmitted on the basis of IntrabandCACellList. For example, in a case where information regarding 5 cells are requested, if a 1$^{st}$ cell and a 3$^{rd}$ cell are implemented with single FFT/IFFT, the UE may transmit bitmap signaling such as '10100 . . . ' to the E-SMLC 1610. When configuring a PRS subframe, the E-SMLC 1610 may transmit information regarding a configuration of a PRS subframe to the eNB 1620 so that PRSs of the 1$^{st}$ cell and the 3$^{rd}$ cell are always configured in the same subframe.

That is, since the UE transmits the PRS subframe timing configuration signal by including information as shown in Table 13, the E-SMLC may configure transmission timing of a PRS subframe of the eNB. Physical cell ID information that can be implemented with single FFT/IFFT as described above may be transmitted from the eNB 1620 or the MME, other than the UE 1600, to the E-SMLC 1610.

If transmission timing of a PRS subframe transmitted in a plurality of cells is configured to be identical, the UE does not decode a PDSCH in a subframe in which a PRS is transmitted, and does not monitor an EPDCCH even if it is configured to monitor the EPDCCH. The UE may receive the PRS according to a configuration of a PRS subframe of a P-cell and an S-cell.

Figure 17:
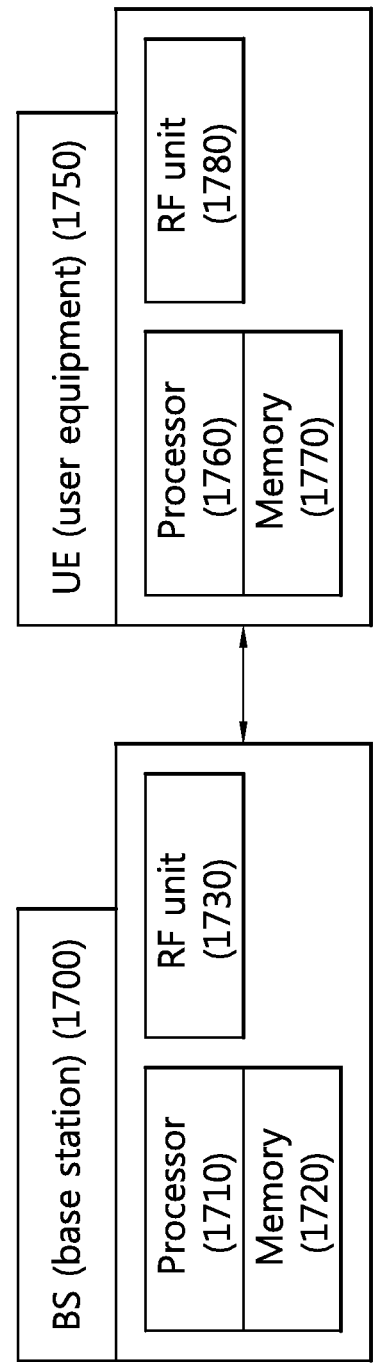
FIG. 17 shows a block diagram of a wireless communication system according to an embodiment of the present invention.

FIG. 17 is a block diagram showing a wireless communication system according to an embodiment of the present invention.

Referring to FIG. 17, a BS 1700 includes a processor 1710, a memory 1720 and a RF unit 1730. The memory 1720 is connected to the processor 1710 and configured to store various information used for the operations for the processor 1710. The RF unit 1730 is connected to the processor 1710 and configured to transmit and/or receive a radio signal. The processor 1710 implements the proposed functions, processed, and/or methods. In the described embodiments, the operation of BS may be implemented by the processor 1710.

For example, a wireless device 1750 includes a processor 1760, a memory 1770, and an RF unit 1780. The memory 1770 is coupled to the processor 1760, and stores a variety of information for driving the processor 1760. The RF unit 1780 is coupled to the processor 1760, and transmits and/or receives a radio signal. The processor 1760 implements the proposed functions, procedures, and/or methods. In the aforementioned embodiment, an operation of the wireless device may be implemented by the processor 1760.

For example, the processor 1760 may be implemented to: receive downlink data on a data subframe transmitted on a first serving cell; receive configuration information regarding a plurality of positioning reference signal (PRS) subframes for transmitting a PRS, wherein the plurality of PRS subframes are transmitted on a second serving cell; and determine whether the user equipment decodes data transmitted through a physical downlink shared channel (PDSCH) or an enhanced physical downlink control channel (EPDCCH) on the data subframe according to the configuration information. If a first cyclic prefix (CP) length of the data subframe is different from a CP length of a first subframe of a first frame including the data subframe, data transmitted through the PDSCH and the EPDCCH may be abandoned by the user equipment. The data subframe may overlap with at least one PRS subframe among the plurality of PRS subframes.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of decoding data on a downlink subframe, the method comprising:
   receiving, by a user equipment, downlink data on a data subframe transmitted by a first serving cell;
   receiving, by the user equipment, configuration information regarding a plurality of positioning reference signal (PRS) subframes for transmitting a PRS, wherein the plurality of PRS subframes are transmitted by a second serving cell; and
   determining whether the user equipment decodes data, transmitted through a physical downlink shared channel (PDSCH) or an enhanced physical downlink control channel (EPDCCH), on the data subframe according to the configuration information,
   wherein if a first cyclic prefix (CP) length of the data subframe is different from a CP length of a first subframe of a first frame including the data subframe, data transmitted through the PDSCH and the EPDCCH is abandoned by the user equipment, and
   wherein the data subframe overlaps with at least one PRS subframe among the plurality of PRS subframes.

2. The method of claim 1, further comprising
   determining whether the user equipment decodes the data transmitted through the PDSCH and the EPDCCH on the PRS subframe according to the configuration information,
   wherein data transmitted through the PDSCH and the EPDCCH is abandoned by the user equipment when a second CP length of the PRS subframe is different from a CP length of a first subframe of a second subframe including the PRS subframe.

3. The method of claim 2,
   wherein the PRS subframe is configured as a multimedia broadcast single frequency network (MBSFN) subframe,
   wherein a subframe other than the PRS subframe in the second subframe is configured as a normal subframe,
   wherein the number of first CRSs mapped to the MBSFN subframe is less than the number of second CRSs mapped to the normal subframe,
   wherein the first CRS is generated on the basis of a reference signal sequence determined as pseudo-random sequence which is initialized to $c_{init}=2^{10} \cdot (7 \cdot (n_s+1)+l+1) \cdot (2 \cdot N_{ID}^{cell}+1)+2 \cdot N_{ID}^{cell}+N_{CP}$,
   wherein $n_s$ is a slot number of the MBSFN subframe, $N_{ID}^{cell}$ is an identifier of the first serving cell, $N_{CP}$ is determined on the basis of a CP length of an OFDM symbol of a slot of the MBSFN subframe, and l is an OFDM symbol index,
   wherein a second CRS is generated on the basis of a reference signal sequence determined as a pseudo-random sequence which is initialized to $c_{init}=2^{10} \cdot (7 \cdot (n_s+1)+l+1) \cdot (2 \cdot N_{ID}^{cell}+1)+2 \cdot N_{ID}^{cell}+N_{CP}$, and
   wherein $n_s$ is a slot number of the normal subframe, $N_{ID}^{cell}$ is an identifier of the first serving cell, $N_{CP}$ is determined on the basis of a CP length of an OFDM symbol of a slot of the normal subframe, and l is an OFDM symbol index.

4. The method of claim 1, wherein the first serving cell and the second serving cell are cells in which carrier aggregation is performed, and the first serving cell and the second serving cell are contiguous frequency regions.

5. A user equipment for decoding data on a downlink subframe, the user equipment comprising:
   a radio frequency (RF) unit that receives the data on the downlink subframe; and a processor, operatively coupled to the RF unit, that:
controls the RF unit to receive downlink data on a data subframe transmitted by a first serving cell;
controls the RF unit to receive configuration information regarding a plurality of positioning reference signal (PRS) subframes for transmitting a PRS, wherein the plurality of PRS subframes are transmitted by a second serving cell; and
determines whether the user equipment decodes data, transmitted through a physical downlink shared channel (PDSCH) or an enhanced physical downlink control channel (EPDCCH), on the data subframe according to the configuration information,
wherein if a first cyclic prefix (CP) length of the data subframe is different from a CP length of a first subframe of a first frame including the data subframe, data transmitted through the PDSCH and the EPDCCH is abandoned by the user equipment, and
wherein the data subframe overlaps with at least one PRS subframe among the plurality of PRS subframes.

6. The user equipment of claim 5,
wherein the processor determines whether the user equipment decodes the data transmitted through the PDSCH and the EPDCCH on the PRS subframe according to the configuration information, and
wherein data transmitted through the PDSCH and the EPDCCH is abandoned by the user equipment when a second CP length of the PRS subframe is different from a CP length of a first subframe of a second subframe including the PRS subframe.

7. The user equipment of claim 6,
wherein the PRS subframe is configured as a multimedia broadcast single frequency network (MBSFN) subframe,
wherein a subframe other than the PRS subframe in the second subframe is configured as a normal subframe,
wherein the number of first CRSs mapped to the MBSFN subframe is less than the number of second CRSs mapped to the normal subframe,
wherein the first CRS is generated on the basis of a reference signal sequence determined as a pseudo-random sequence which is initialized to $c_{init}=2^{10} \cdot (7 \cdot (n_s+1)+l+1) \cdot (2 \cdot N_{ID}^{cell}+1)+2 \cdot N_{ID}^{cell}+N_{CP}$,
wherein $n_s$ is a slot number of the MBSFN subframe, is an identifier of the first serving cell, $N_{CP}$ is determined on the basis of a CP length of an OFDM symbol of a slot of the MBSFN subframe, and l is an OFDM symbol index,
wherein a second CRS is generated on the basis of a reference signal sequence determined as a pseudo-random sequence which is initialized to $c_{init}=2^{10} \cdot (7 \cdot (n_s+1)+l+1) \cdot (2 \cdot N_{ID}^{cell}+1)+2 \cdot N_{ID}^{cell}+N_{CP}$, and
wherein $n_s$ is a slot number of the normal subframe, $N_{ID}^{cell}$ is an identifier of the first serving cell, $N_{CP}$ is determined on the basis of a CP length of an OFDM symbol of a slot of the normal subframe, and l is an OFDM symbol index.

8. The user equipment of claim 5, wherein the first serving cell and the second serving cell are cells in which carrier aggregation is performed, and the first serving cell and the second serving cell are contiguous frequency regions.

* * * * *